United States Patent
Tamaki

(10) Patent No.: US 10,191,334 B2
(45) Date of Patent: Jan. 29, 2019

(54) LIQUID CRYSTAL DISPLAY

(71) Applicant: Japan Display Inc., Tokyo (JP)

(72) Inventor: Masaya Tamaki, Tokyo (JP)

(73) Assignee: Japan Display Inc., Tokyo (JP)

( * ) Notice: Subject to any disclaimer, the term of this patent is extended or adjusted under 35 U.S.C. 154(b) by 7 days.

(21) Appl. No.: 15/454,435

(22) Filed: Mar. 9, 2017

(65) Prior Publication Data

US 2017/0261796 A1    Sep. 14, 2017

(30) Foreign Application Priority Data

Mar. 11, 2016    (JP) ................... 2016-048603

(51) Int. Cl.
*G02F 1/1335* (2006.01)
*G02F 1/1339* (2006.01)
*G02F 1/1343* (2006.01)

(52) U.S. Cl.
CPC ...... *G02F 1/13394* (2013.01); *G02F 1/13439* (2013.01); *G02F 1/133512* (2013.01); *G02F 1/133553* (2013.01); *G02F 1/134309* (2013.01); *G02F 2001/13398* (2013.01); *G02F 2001/134345* (2013.01); *G02F 2201/123* (2013.01); *G02F 2201/50* (2013.01)

(58) Field of Classification Search
None
See application file for complete search history.

(56) References Cited

U.S. PATENT DOCUMENTS

| 7,738,067 | B2* | 6/2010 | Chen | G02F 1/13394 |
| | | | | 349/106 |
| 2007/0126969 | A1* | 6/2007 | Kimura | G02F 1/134363 |
| | | | | 349/141 |
| 2010/0188365 | A1* | 7/2010 | Tamaki | G06F 3/0412 |
| | | | | 345/174 |
| 2016/0109751 | A1* | 4/2016 | Nakagawa | G02B 5/201 |
| | | | | 349/106 |

FOREIGN PATENT DOCUMENTS

| JP | 2003-215553 | A | | 7/2003 |
| JP | 2010-170050 | A | | 8/2010 |
| JP | 2012-181441 | | * | 9/2012 |
| JP | 2012-181441 | A | | 9/2012 |

* cited by examiner

*Primary Examiner* — Ryan Crockett
(74) *Attorney, Agent, or Firm* — Michael Best & Friedrich LLP

(57) ABSTRACT

According to one embodiment, a liquid crystal display comprising a first substrate, a second substrate opposed the first substrate, a liquid crystal layer between the first substrate and the second substrate, a light-shielding layer including a first light-shield formed along a first direction and a second light-shield formed along a second direction and crossing the first light-shield, and a spacer which maintains a gap between the first substrate and the second substrate, the spacer overlapping a crossing region where the first light-shield and the second light-shield cross each other and including an exposed region outside the light-shielding layer in a planar view.

13 Claims, 18 Drawing Sheets

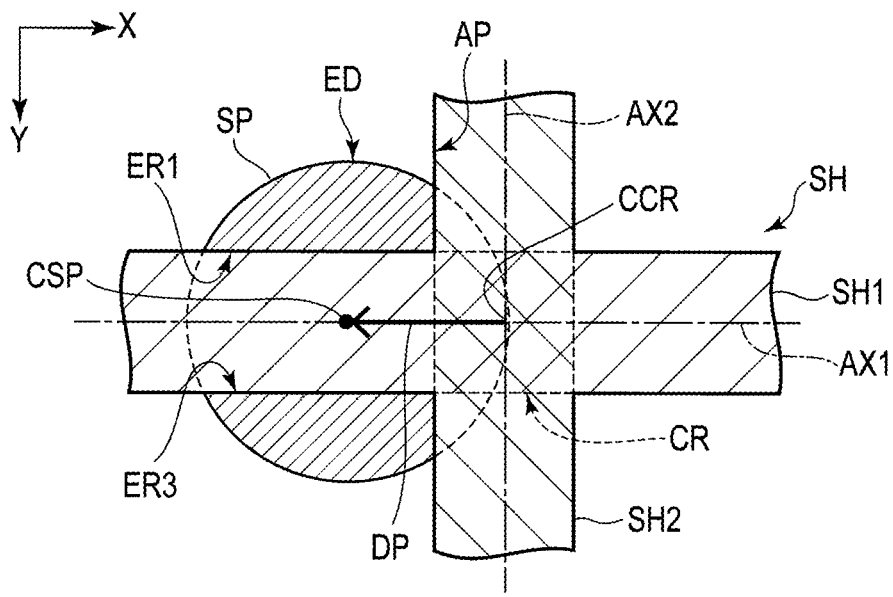
F I G. 5

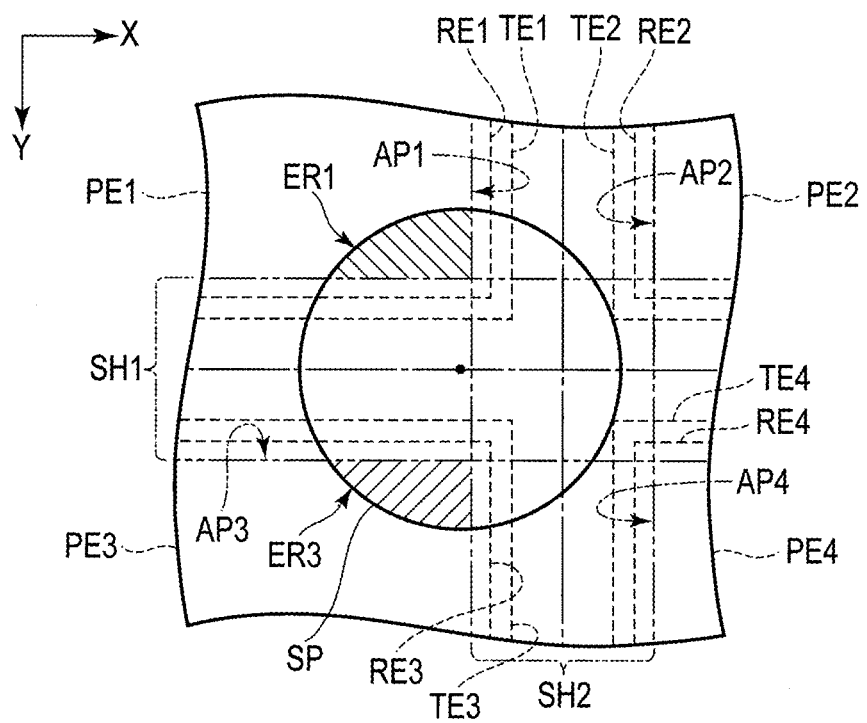
F I G. 8

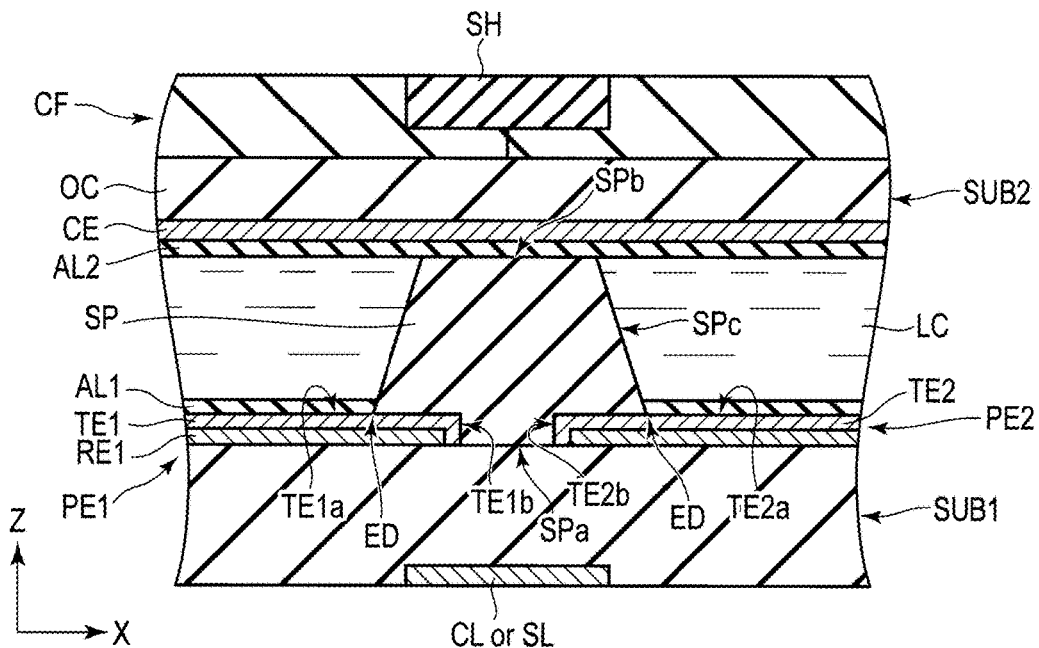
F I G. 10
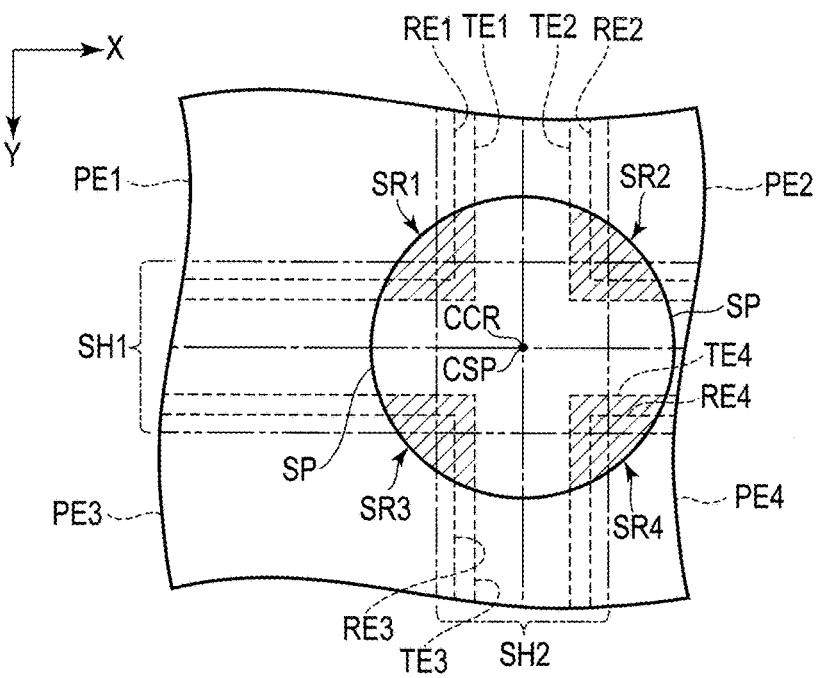
F I G. 11

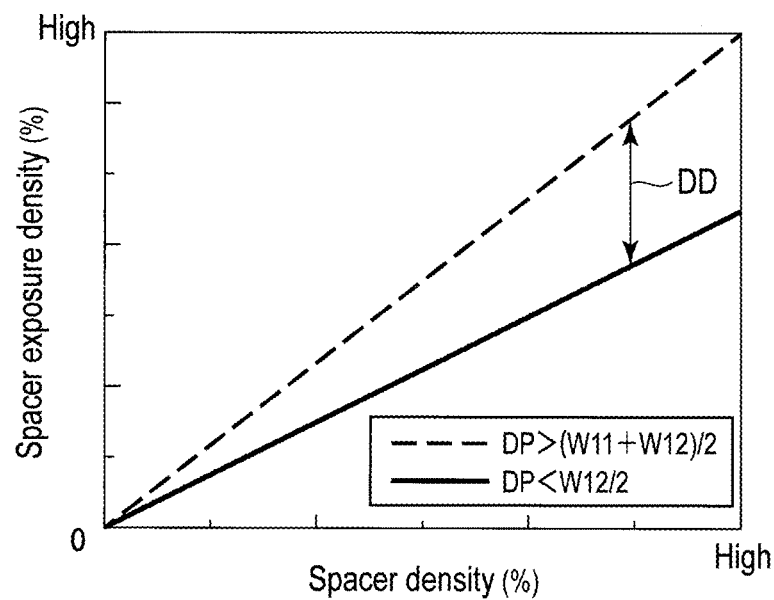
F I G. 12
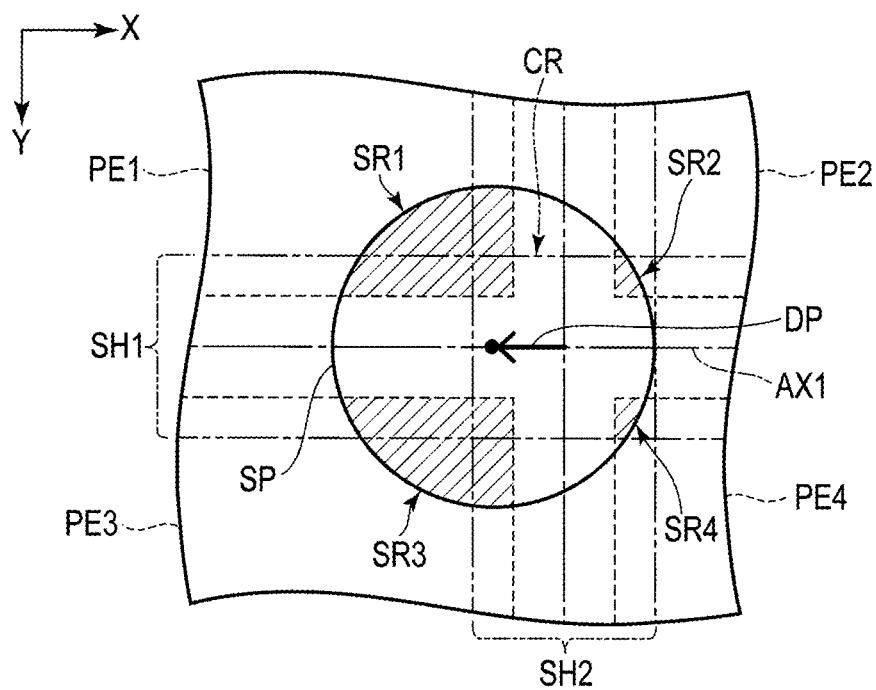
F I G. 13

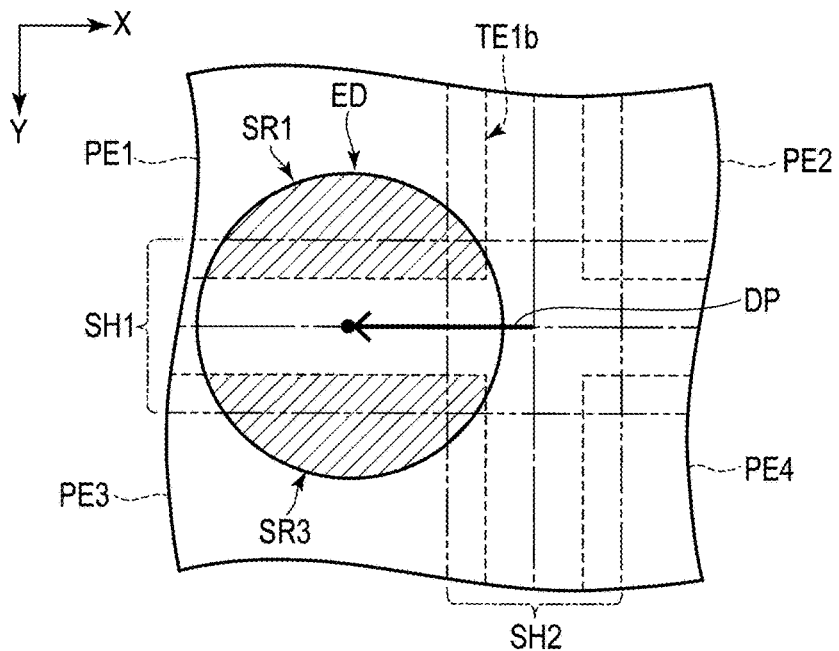
F I G. 14
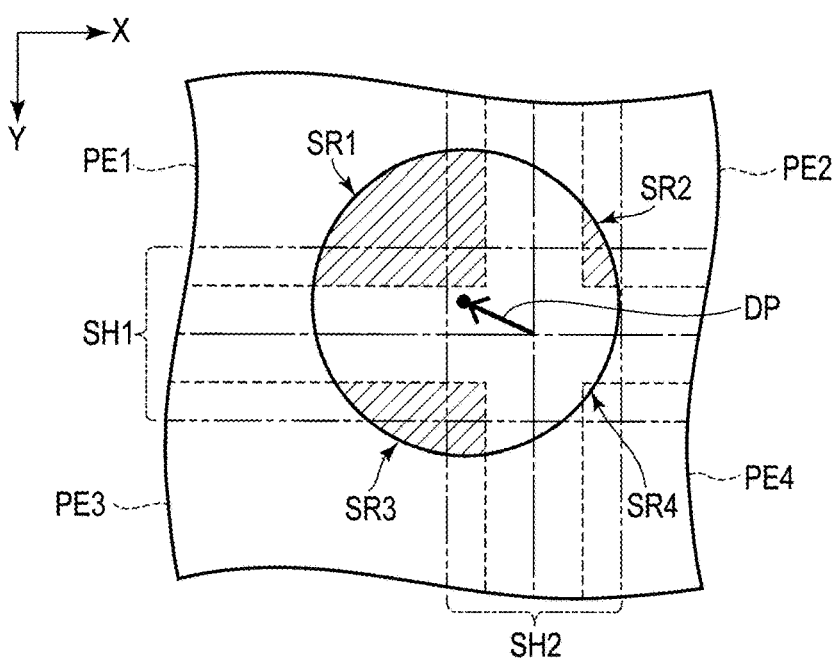
F I G. 15

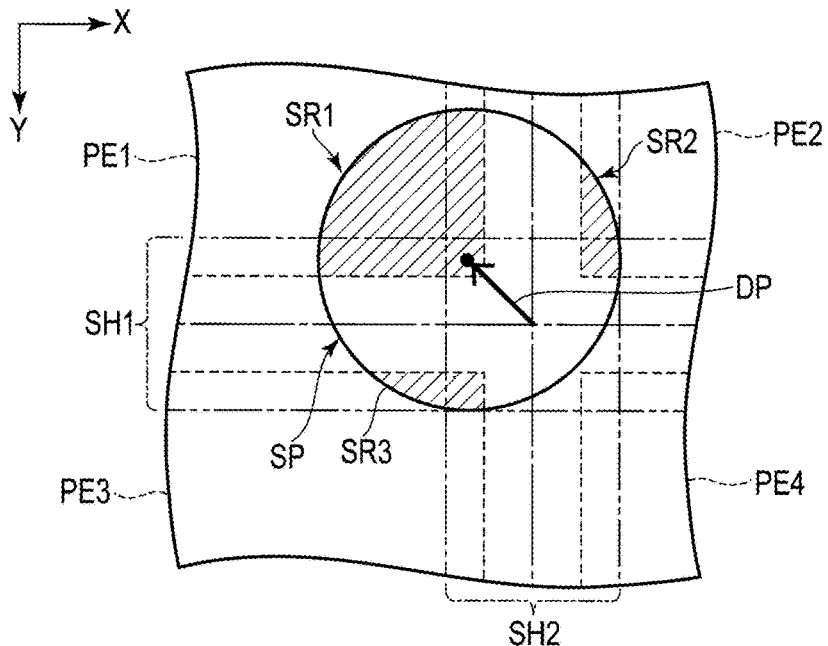
F I G. 16
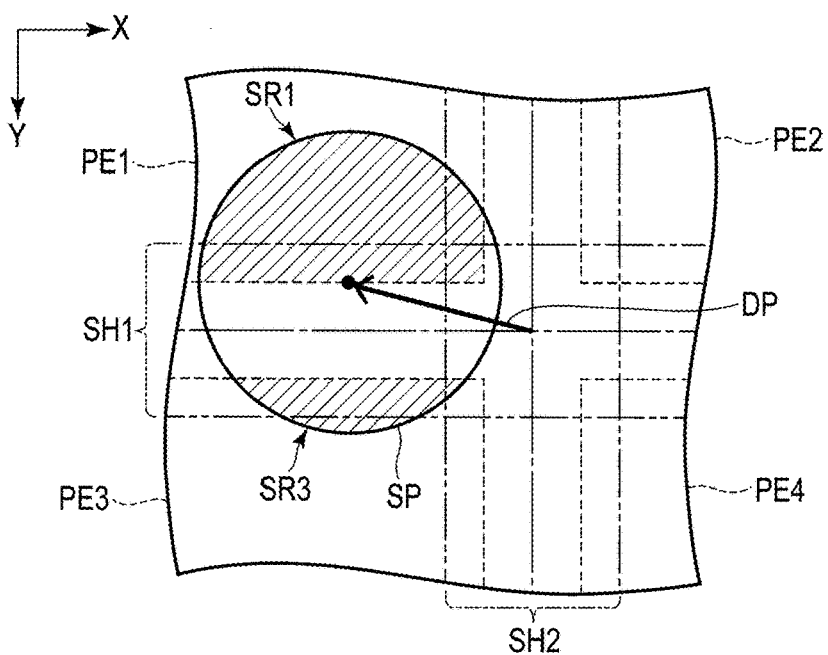
F I G. 17

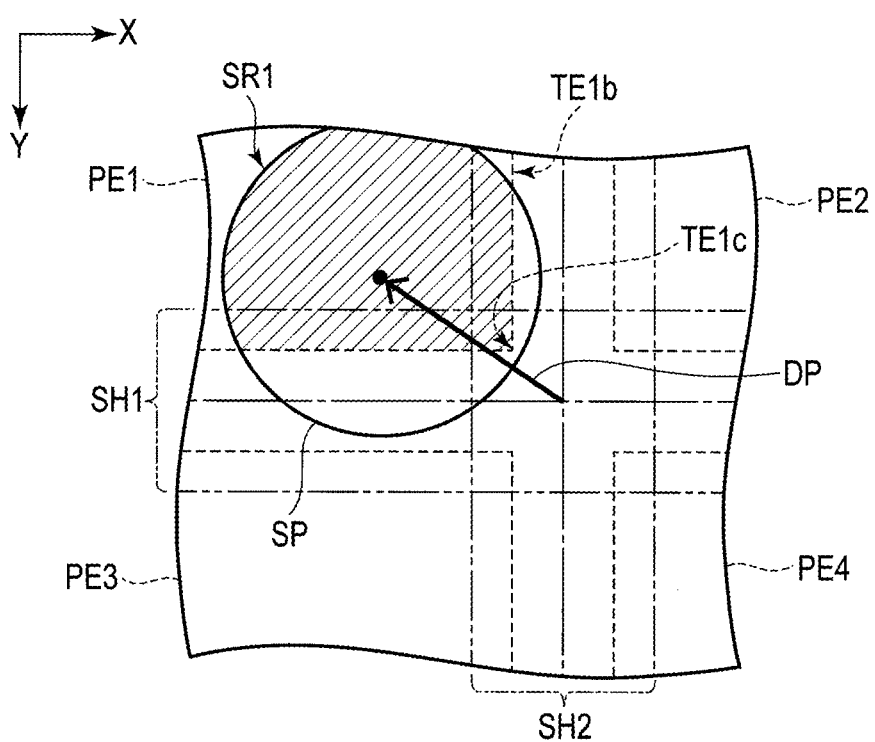
F I G. 18

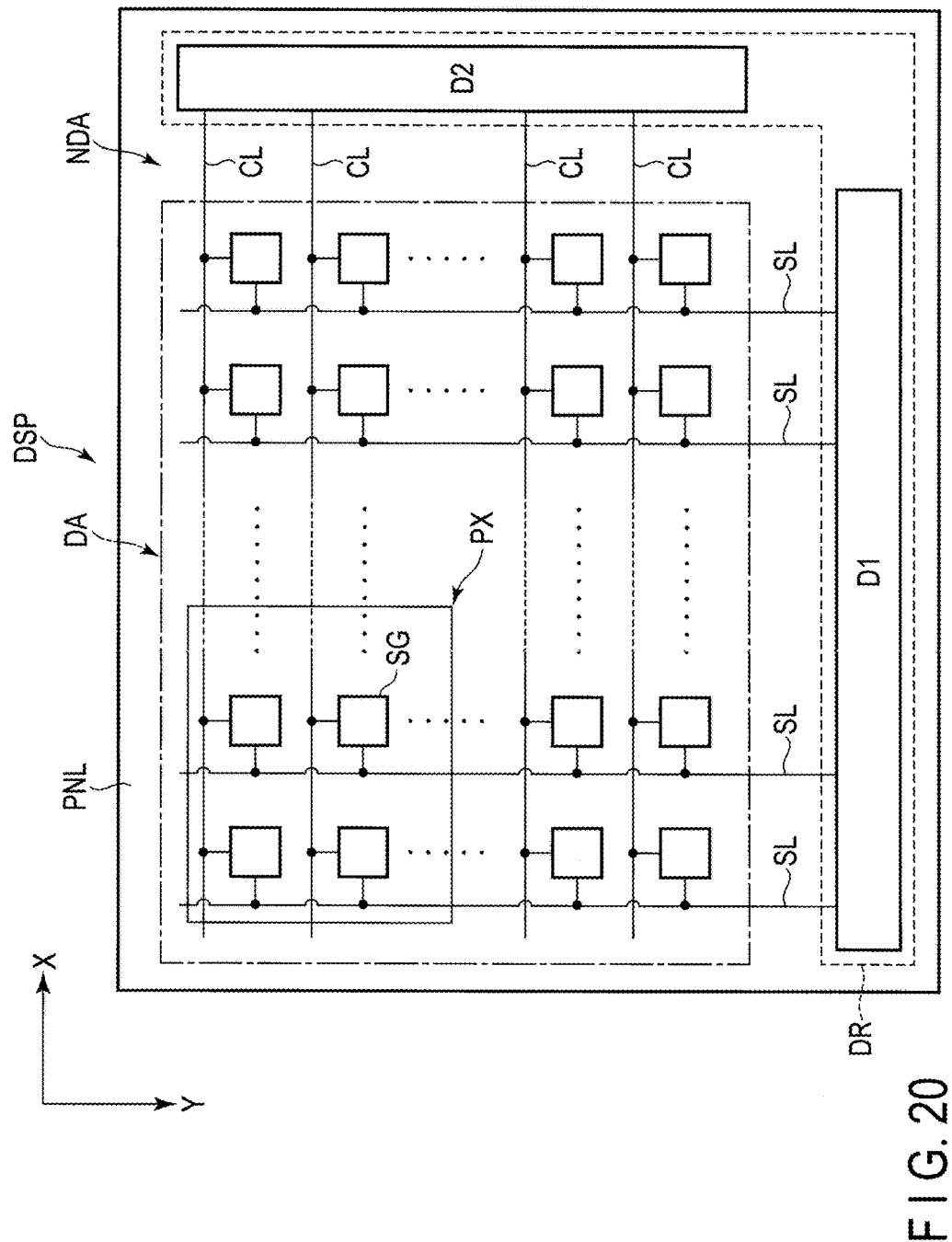
F I G. 20

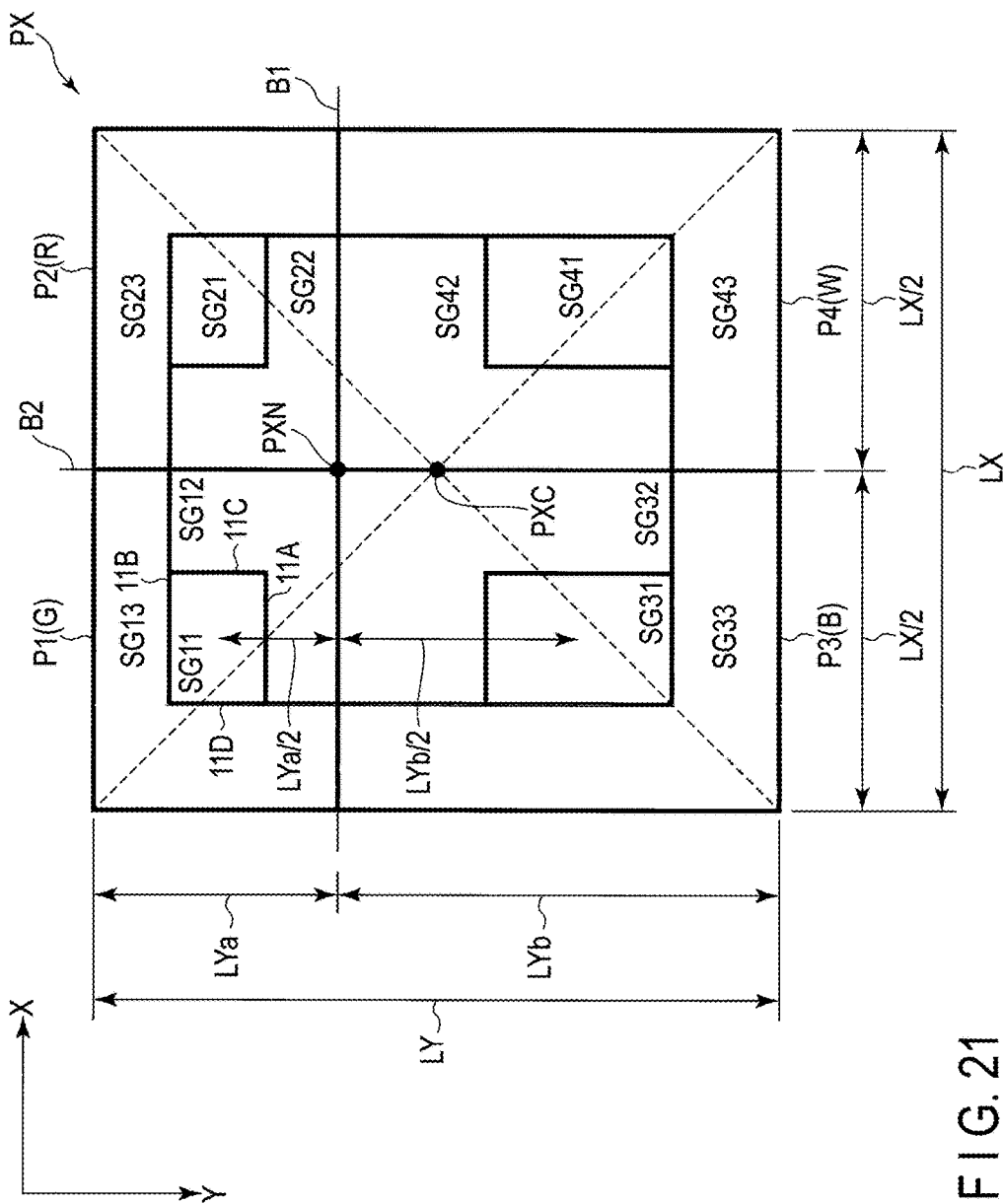
F I G. 21

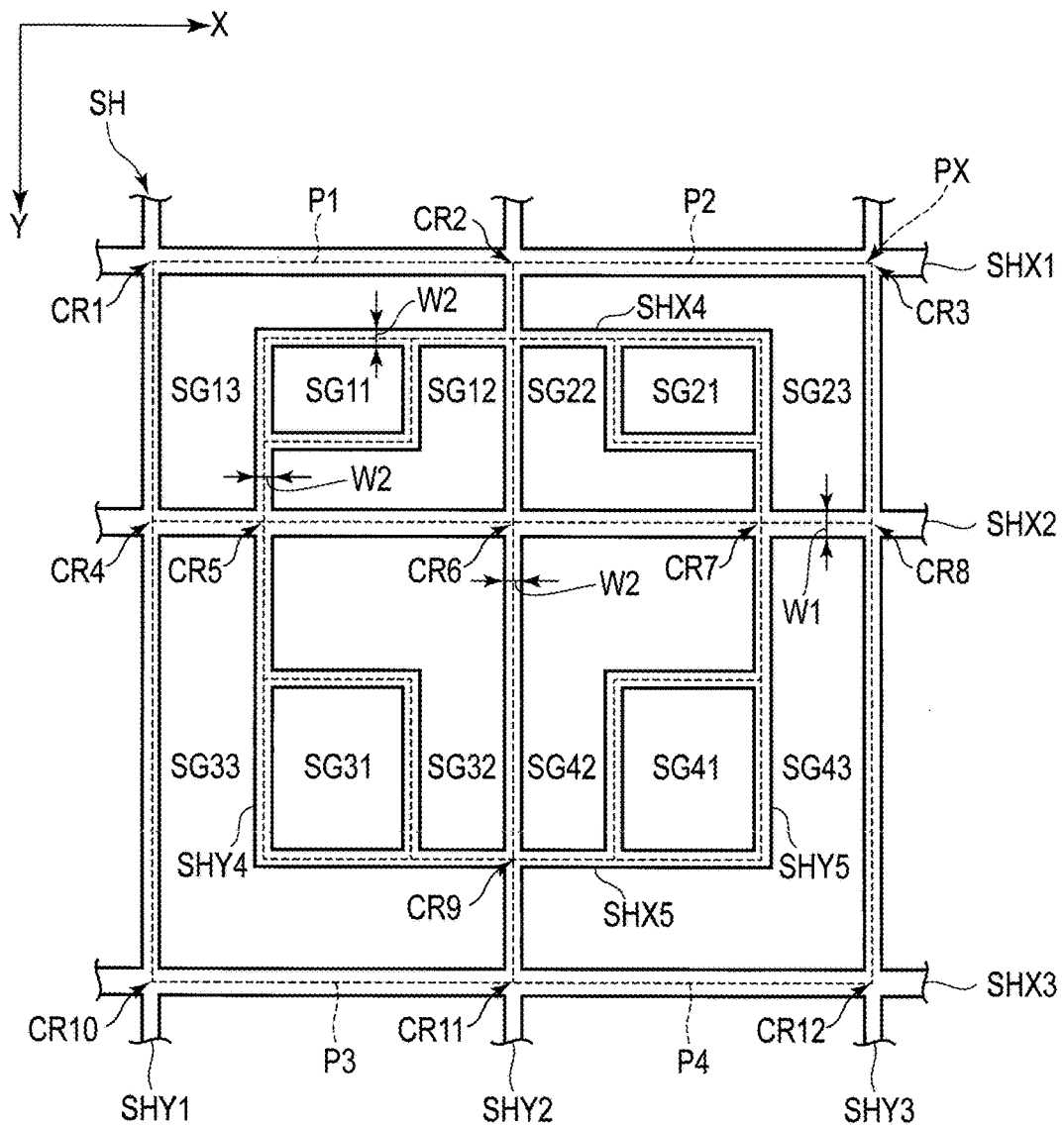
F I G. 22

LIQUID CRYSTAL DISPLAY

CROSS-REFERENCE TO RELATED APPLICATIONS

This application is based upon and claims the benefit of priority from Japanese Patent Application No. 2016-048603, filed Mar. 11, 2016, the entire contents of which are incorporated herein by reference.

FIELD

Embodiments described herein relate generally to a liquid crystal display.

BACKGROUND

Liquid crystal displays comprise, for example, a columnar spacer to maintain the interval between a pair of substrates. The columnar spacer is overlaid on, for example, the pixel electrodes in order to enhance the adhesion with the substrates. However, the alignment of the liquid crystal molecules is disordered near the columnar spacer, and therefore a light-shielding layer is disposed to overlap the columnar spacer and its surroundings, thereby decreasing the area of the opening portion.

BRIEF DESCRIPTION OF THE DRAWINGS

FIG. 5 is a diagram showing the crossing region and the spacer arranged so that the centers thereof separate from each other in a planer view.

FIG. 8 is a diagram showing the pixel electrode and the spacer when the display panel shown in FIG. 7A is viewed planarly.

FIG. 10 is an expanded cross section of the display panel of the case where the centers of the spacer and the crossing region coincide in a planer view.

FIG. 11 is a diagram showing the pixel electrode and the spacer when the display panel shown in FIG. 10 is viewed planarly.

FIG. 12 is a graph showing the relationship between a spacer density and a spacer exposure density.

FIG. 13 is a diagram showing an overlapping region of the case where the center of the spacer is separated from the center of the crossing region in the first direction.

FIG. 14 is a diagram showing an overlapping region of the case where the center of the spacer is separated further from the center of a crossing region in the first direction than that of FIG. 13.

FIG. 15 is a diagram showing an overlapping region of the case where the center of the spacer is separated further from the center of the crossing region in the second direction than that of FIG. 13.

FIG. 16 is a diagram showing an overlapping region of the case where the center of the spacer is separated further from the center of the crossing region in the second direction than that of FIG. 15.

FIG. 17 is a diagram showing an overlapping region of the case where the center of the spacer is separated further from the center of the crossing region in the first direction than that of FIG. 15.

FIG. 18 is a diagram showing an overlapping region of the case where the center of the spacer is separated further from the center of the crossing region in the second direction than that of FIG. 17.

FIG. 20 is a diagram showing the structure of a display panel.

FIG. 21 is a diagram showing the structure of a unit pixel.

FIG. 22 is a diagram showing the structure of the light-shielding layer corresponding to the unit pixel shown in FIG. 21.

DETAILED DESCRIPTION

Figure 1:
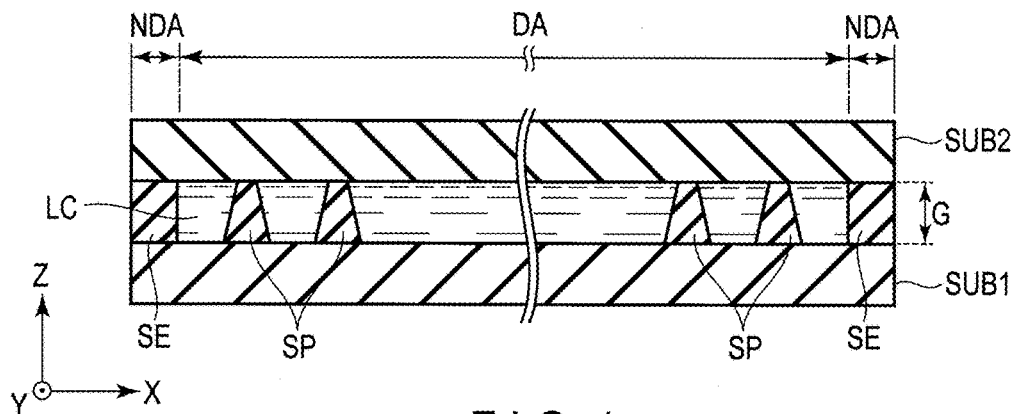
FIG. 1 is a diagram showing a cross section of a display device.

In general, according to one embodiment, there is provided a liquid crystal display comprising: a first substrate; a second substrate opposed the first substrate; a liquid crystal layer between the first substrate and the second substrate; a light-shielding layer including a first light-shield formed along a first direction and a second light-shield formed along a second direction and crossing the first light-shield; and a spacer which maintains a gap between the first substrate and the second substrate, the spacer overlapping a crossing region where the first light-shield and the second light-shield cross each other and including an exposed region outside the light-shielding layer in a planar view.

According to another embodiment, there is provided A liquid crystal display comprising: a first substrate; a second substrate opposed the first substrate; a liquid crystal layer between the first substrate and the second substrate; a light-shielding layer including a first light-shield formed along a first direction, a second light-shield and a third light-shield formed in a second direction, a first crossing region where the first light-shield and the second light-shield cross each other, and a second crossing region where the first light-shield and the third light-shield cross each other, and a spacer including a first spacer overlapping the first crossing region and a second spacer overlapping the second crossing region and holding a gap between the first substrate and the second substrate, the first spacer including a first exposed region outside the light-shielding layer, the second spacer including a second exposed region outside the light-shielding layer, the first exposed region located adjacent to the first light-shield in a forward direction of the second direction, and the second exposed region located adjacent to the first light-shield in a backward direction of the second direction.

Embodiments will be described hereinafter with reference to the accompanying drawings. The disclosure is merely an example, and proper changes within the spirit of the invention, which are easily conceivable by a skilled person, are included in the scope of the invention as a matter of course.

In addition, in some cases, in order to make the description clearer, the widths, thicknesses, shapes, etc. of the respective parts are schematically illustrated in the drawings, compared to the actual modes. However, the schematic illustration is merely an example, and adds no restrictions to the interpretation of the invention. Besides, in the specification and drawings, the same elements as those described in connection with preceding drawings are denoted by like reference numerals, and a detailed description thereof is omitted unless otherwise necessary.

In the present embodiment, a liquid crystal display device is described as an example of the display device. For example, the display device is applicable to various devices such as smartphones, tablet computers, feature phones, computers, TVs, in-car devices, and game consoles. The major configuration explained in the present embodiment can also be applied to, for example, an electronic paper display device comprising a cataphoretic element, a display device employing micro-electromechanical systems (MEMS), or a display device employing electrochromism.

FIG. 1 is a cross-section of a display device. Note that a first direction X is, for example, a direction along a short-side of a display panel PNL. A second direction Y is a direction crossing the first direction X, which is a direction, for example, along a long-side of the display panel PNL. A third direction Z is a direction crossing the first direction X and the second direction Y, which is, for example, a normal direction to the display panel PNL. In the figure illustrated, the first direction X and the second direction Y are orthogonal to each other, and the third direction Z is orthogonal to both the first direction X and the second direction Y. The first direction X and the second direction Y may cross each other at an angle other than orthogonal.

The display device DSP comprises a display area DA and a non-display area NDA surrounding the display area DA. The display panel PNL comprises a first substrate SUB1, a second substrate SUB2 opposing the first substrate SUB1, and a liquid crystal layer LC between the first substrate SUB1 and the second substrate SUB2. The second substrate SUB2 opposes the first substrate SUB1 along the third direction Z with a gap G therebetween, and spacers SP and sealing materials SE are provided between the first substrate SUB1 and the second substrate SUB2. The spacers SP are arranged at certain intervals in the display area DA, to maintain the gap G between the first substrate SUB1 and the second substrate SUB2. The spacers SP are formed of, for example, a photoresist such as an acrylic resin. The sealing materials SE are provided in the non-display area NDA so as to attach the first substrate SUB1 and the second substrate SUB2 to each other. The sealing materials SE are formed of, for example, a thermosetting resin, photosetting resin or the like. The liquid crystal layer LC is provided to fill the space enclosed by the first substrate SUB1, the second substrate SUB2 and the sealing materials SE.

Figure 2:
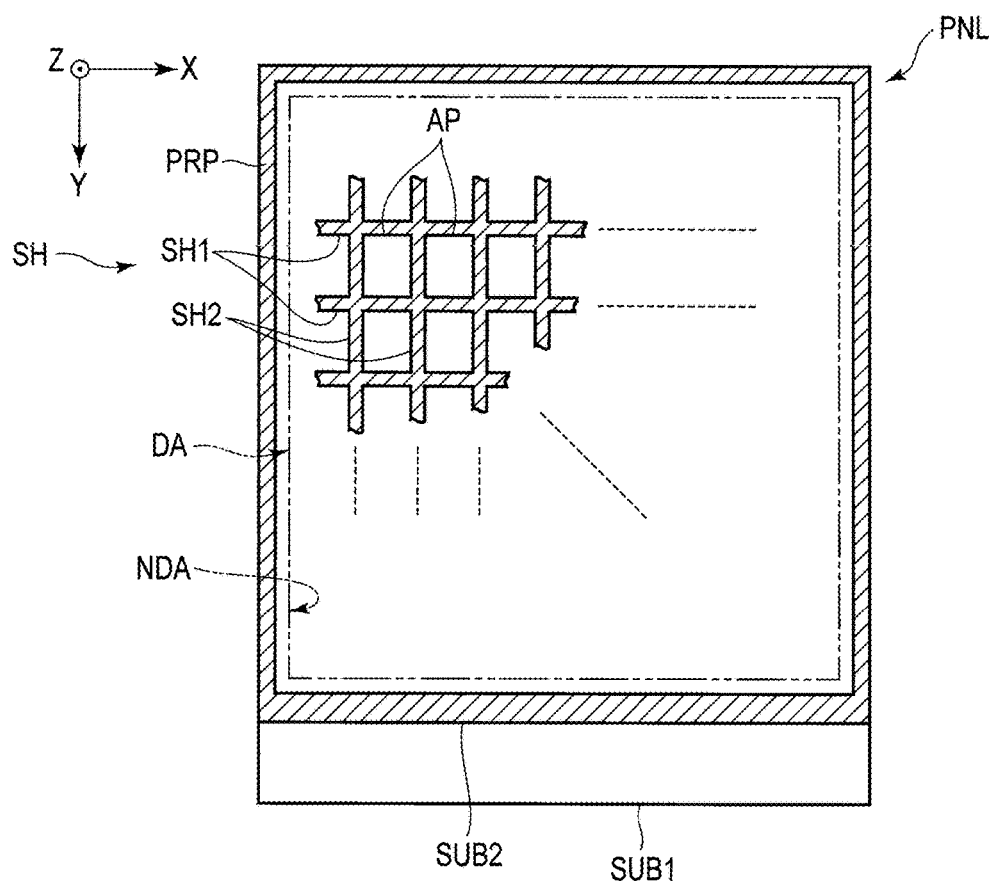
FIG. 2 is a planer view of a display panel.

FIG. 2 is a diagram showing the display panel in a planer view. The planar view is a state observed from a forward direction to an opposite direction along the third direction Z. Or the planar view can be defined as a state of observing the display area DA from a viewpoint established in a normal direction to the surface of the display area DA. Note that not only in the case of the third direction Z, but in all of the first to third directions X, Y and Z, the forward direction is a direction pointed by the tip of an arrow, and the opposite direction is a direction opposite to that pointed by the tip of an arrow.

The shape of the display panel PNL in a planer view is rectangular in the example illustrated, but not particular limited. It may be some other quadrangular shape than that illustrated, such as rhombic or trapezoid, or other polygonal shape such as triangular or pentagonal. The shape of the display panel PNL in a planer view may contain a curve such as of a circle (ellipse) or a sector. Similarly, the shape of the display area DA in a planer view is rectangular in the example illustrated, but not particular limited. It may be a polygonal shape other than rectangular, or may contain a curve such as of a circle or an ellipse.

The display panel PNL comprises a light-shielding layer SH. The light-shielding layer SH contains, for example, a black resin to suppress reflection and transmission of light. The light-shielding layer SH includes a peripheral light-shielding layer PRP disposed in the non-display area NDA, and a plurality of light-shields SH1 and SH2 each in stripe in the display area DA. The light-shields SH1 are each formed along the first direction X and arranged with an interval in the second direction Y. The light-shields SH2 are each formed in the second direction Y to cross the light-shields SH1 while being arranged at an interval in the first direction X. The light-shields SH1 and SH2 are arranged in a grid shape so as to define apertures AP each by an adjacent pair of light-shields SH1 and a respective adjacent pair of light-shields SH2. The light entering the display panel PNL is shielded by the light-shielding layer SH and transmits the apertures AP. The apertures AP are arranged in a matrix, for example, along the first direction X and the second direction Y.

Figure 3:
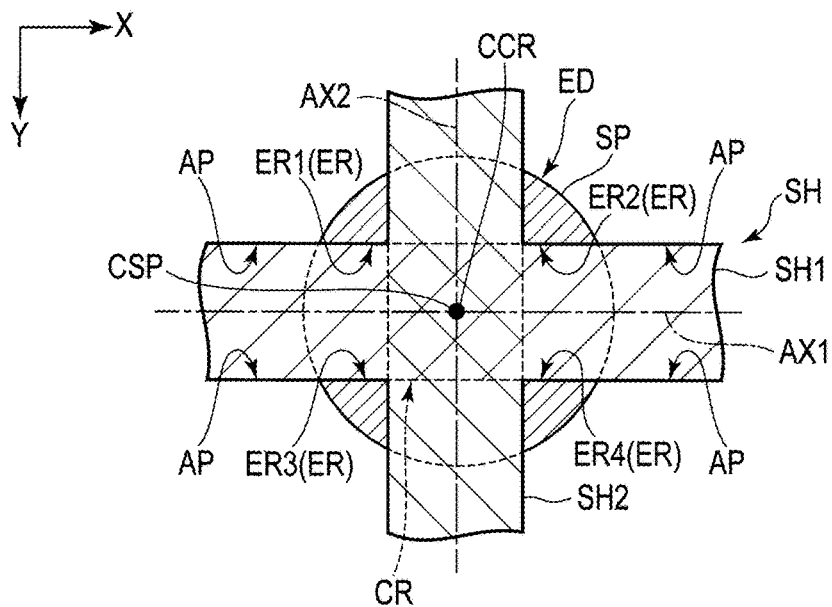
FIG. 3 is a diagram showing a crossing region and a spacer arranged so that the centers thereof coincide in a planer view.

FIG. 3 is a diagram showing a crossing region and a spacer arranged so that the centers thereof coincide with each other in a planer view.

Spacer SP is overlaid on the light-shielding layer SH. In a planer view, the spacer SP is overlaid on a crossing region CR where the light-shields SH1 and the light-shields SH2 cross each other, and the spacer includes an exposed region ER exposed to the outside of the light-shielding layer SH. In the example illustrated, a center CSP of the spacer SP is overlaid on the crossing region CR and the spacer SP includes four exposed regions ER1, ER2, ER3 and ER4. The exposed regions ER1 to ER4 are overlaid on the apertures AP, respectively. the center CSP may be overlaid on or separated from the center CCR of the crossing region CR. Here, the center CSP is the geometric center of the figure defined by edge ED of the spacer SP. The edge ED is equivalent to the outermost circumference of the spacer SP in a planer view. When the spacer SP is formed into a tapered shape with a bottom and a top the area of which is smaller than that of the bottom, the edges ED are each equivalent to an edge of the bottom. Moreover, the center CCR is at an intersection of a central axis AX1 of the light-shield SH1 and a central axis AX2 of the light-shield SH2. The central axis AX1 is a virtual line which connects a middle point of the light-shield SH1 along the second direction Y, and extends in the first direction X. The central axis AX2 is a virtual line which connects a middle point of the light-shield SH2 along the first direction X, and extends in the second direction Y.

The exposed region ER1 opposes the exposed region ER2 via the light-shield SH2 along the first direction X, and also opposes the exposed region ER3 via the light-shield SH1 along the second direction Y. The exposed region ER4 opposes the exposed region ER3 via the light-shield SH2 along the first direction X, and opposes the exposed region ER2 via the light-shield SH1 along the second direction Y, and also opposes the exposed region ER1 via the crossing region CR.

Figure 4:
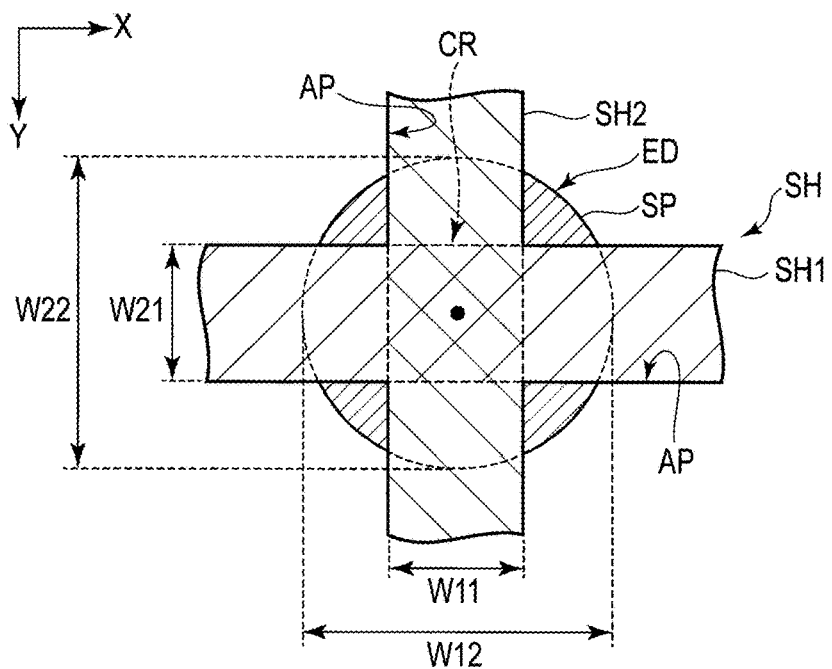
FIG. 4 is an diagram showing the widths of a light-shielding layer and a spacer.

FIG. 4 is a diagram showing widths of a light-shielding layer and a spacer.

A width W12 of the spacer SP along the first direction X is greater than a width W11 of the second light-shield SH2 along the first direction X. A width W22 of the spacer SP along the second direction Y is greater than a width W21 of the first light-shield SH1 along the second direction Y. The width W12 and W22 are equivalent to the maximum widths of the figure defined by the edge ED along the first direction X and the second direction Y, respectively. In the example illustrated, the figure defined by the edge ED is a circle, by which the widths W12 and W22 are equal to each other, and equivalent to the diameter of the circle defined by the edge ED. The widths W11 and W21 are equivalent to the maximum widths of the crossing region CR along the first direction X and the second direction Y, respectively, for example. The light-shielding layer SH does not comprise a light-shield which shields the regions corresponding to the exposed regions ER1 to ER4. In the example illustrated, the width W21 of the light-shield SH1 along the second direction Y is uniform at any location. Further, the width W11 of the light-shield SH2 along the first direction X is also uniform at any location in the example illustrated. In other words, the widths W21 and W11 are each constant even at a location close to or separate from the crossing region CR.

The area of the effective display region of each aperture AP, which contributes to display is the area obtained by deducting the area of each respective exposed region ER (ER1, ER2, ER3 or ER4) from the area of each aperture AP. Note here that an total area of the exposed region ER of one spacer SP should desirably be smaller because in the vicinities of the four exposed regions ER1 to ER4, the alignment of the liquid crystal composition of the liquid crystal layer LC may be disordered to degrade the contrast. Thus, from a viewpoint of improving the aperture ratio, which indicates the area ratio of the aperture AP to the display area DA, it is desirable that the widths W12 and W22 of the spacer SP be small, and also the width W11 and W21 of the light-shield SH1 and SH2 should desirably smaller in proportion to the decrease of the width W11 and W21.

FIG. 5 is a diagram showing a crossing region and a spacer arranged so that the centers thereof are separate from each other in a planer view.

Here, the departure from a center CSP to a center CCR will be expressed as a displacement DP. In the example illustrated, the direction of the displacement DP is opposite to the first direction X, and the dimension of the displacement DP is less than the radius of the spacer SP. Here, from a viewpoint of suppressing the ratio occupied by the area of the exposed region ER1 to the area of the aperture AP, it is desirable that the spacer SP overlap at least the crossing region CR or more desirably the center CCR.

In other words, the degree of the displacement DP should desirably be less than (W12+W11)/2, or more desirably less than or equal to 2/W12.

Figure 6:
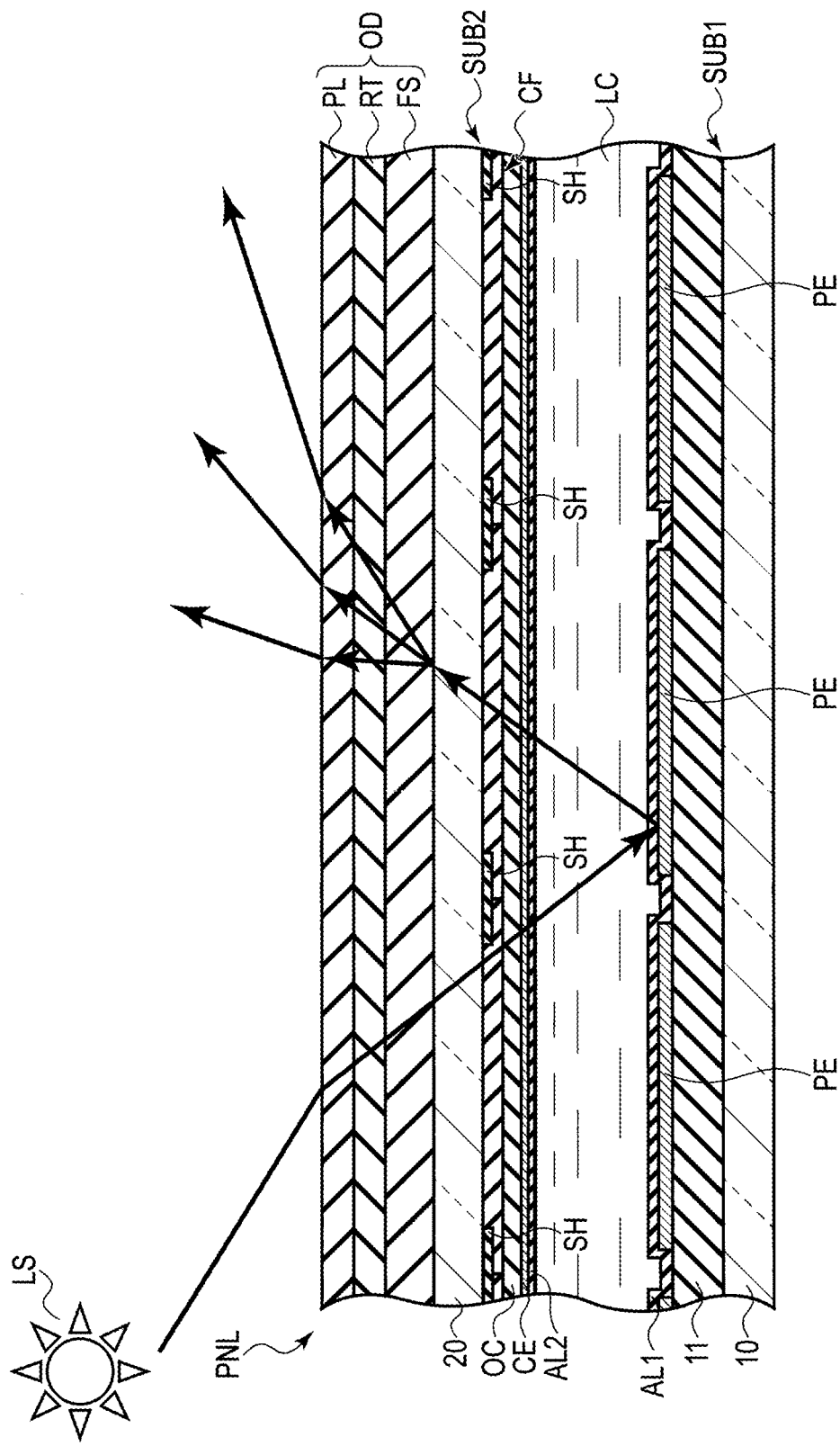
FIG. 6 is a cross section of a structure of the display panel.

FIG. 6 is a cross section showing the structure of the display panel.

The display panel PNL comprises a liquid crystal layer LC and an optical element OD in addition to the first substrate SUB1 and the second substrate SUB2 shown in FIG. 1. In the structure example illustrated, the display panel PNL is a reflection type with a reflective display function which displays images by selectively reflecting light. Note that the display panel PNL may be a transmissive display panel with a transmissive display function which displays images by selectively transmitting light. Further, the display panel PNL may be a transflective display device with both the transmissive and reflective display functions.

The first substrate SUB1 comprises a first insulating substrate 10, an insulating film 11, a plurality of pixel electrodes PE, alignment film AL1 and the like. Although not illustrated, the first substrate SUB1 includes various wiring lines such as control lines CL and signal lines SL, which will be described later with reference to FIG. 20. The first insulating substrate 10 is formed from a transparent insulating substrate such as a glass or resin substrate and into a flat plate shape with a pair of surfaces opposing each other. The insulating film 11 is disposed on one of the pair of the surfaces of the first insulating substrate 10, which opposes the second substrate SUB2, and is formed from, for example, an organic insulating material such as an acrylic resin. The pixel electrodes PE are disposed on the insulating film 11. The alignment film AL1 covers the pixel electrodes PE.

The second substrate SUB2 comprises a second insulating substrate 20, a light-shielding layer SH, a color filter layer CF, an overcoat layer OC, a common electrode CE, an alignment film AL2 and the like. The second insulating substrate 20 is formed from a transparent insulating substrate such as a glass or resin substrate and into a flat plate shape with a pair of surfaces opposing each other. The light-shielding layer SH is located on one of the pair of the surfaces of the second insulating substrate 20, which opposes the first substrate SUB1. In the example illustrated, the light-shielding layer SH opposes a gap between an adjacent pair of pixel electrodes PE. The color filter layer CF is located on the one of the pair of the surfaces of the second insulating substrate 20, which opposes the first substrate SUB1. Although not described in detail, the color filter layer CF includes, for example, a red filter, a green filter and a blue filter. Each color filter overlaps the light-shielding layer SH by its end. Note that the color filter layer CF may include a filter of some other color, such as white, or a transparent layer. The overcoat layer OC covers the color filter layer CF. The common electrode CE is located on a side of the overcoat layer OC, which opposes the first substrate SUB1. The common electrode CE opposes the pixel electrodes PE. The common electrode CE is formed from a transparent conductive material such as indium-tin oxide (ITO) or indium-zinc oxide (IZO). The alignment film AL2 covers the common electrode CE.

The liquid crystal layer LC is adjacent to the alignment films AL1 and AL2. In the example illustrated, the display panel PNL is of a vertical electric field type which varies the optical property of the liquid crystal layer LC by utilizing the electric field produced in the liquid crystal layer LC along the normal direction to the first substrate SUB1 according to the potential difference between the pixel electrode PE and the common electrode CE. The liquid crystal layer LC contains a liquid crystal composition which has negative dielectric anisotropy. Note that the display panel PNL may be of a lateral electric field type which produces an electric field to be utilized, which is parallel to the first substrate SUB in the liquid crystal layer LC, or may be an oblique electric field type which produces an electric field oblique to the first substrate SUB1. In the lateral electric field type panel, both the pixel electrode PE and the common electrode CE are disposed on the first substrate SUB1. Here, the display panel PNL should desirably be of the so-called normally white mode, which exhibits a display state (white display) when voltage is not applied to the pixel electrode PE, and a non-display state (black display) when voltage is applied. In the display state, the liquid crystal composition is initially aligned along the normal direction to the first substrate SUB1 by the alignment restriction force of the alignment films AL1 and AL2. In the non-display state, the liquid crystal composition is aligned along the direction perpendicular to the electric field since it has negative dielectric anisotropy.

The optical element OD is located on one of the pair of surfaces of the second substrate SUB2, which is opposite to the one in contact with the liquid crystal layer LC. The optical element OD comprises, for example, a scattering layer FS, a retardation plate RT, polarizer PL, and the like. The scattering layer FS is adhered to the second insulating substrate 20, the retardation plate RT is stacked on the scattering layer FS, and the polarizer PL is stacked on the retardation plate RT. Note that the structure of the optical element OD is not restricted to the example illustrated.

The scattering layer FS is an anisotropic scattering layer which scatters the light entering from a specific direction. In the example illustrated, the scattering layer FS has the function to transmit light entering from the light source LS side without substantially scattering and scatter the reflection light from a specific direction, that is, the reflection light from the pixel electrode PE. It is desirable to stack a plurality of scattering layers FS for such purposes of extending the range of diffusion, preventing rainbow hues and the like. The retardation film RT is stacked on the forward-scattering film FS. The retardation film RT is a quarter-wave plate. For example, the retardation film RT is constituted by stacking a quarter-wave plate and a half-wave plate so as to reduce a wavelength dependency and obtain a desired phase difference within a wavelength range used for color display.

Figure 7A:
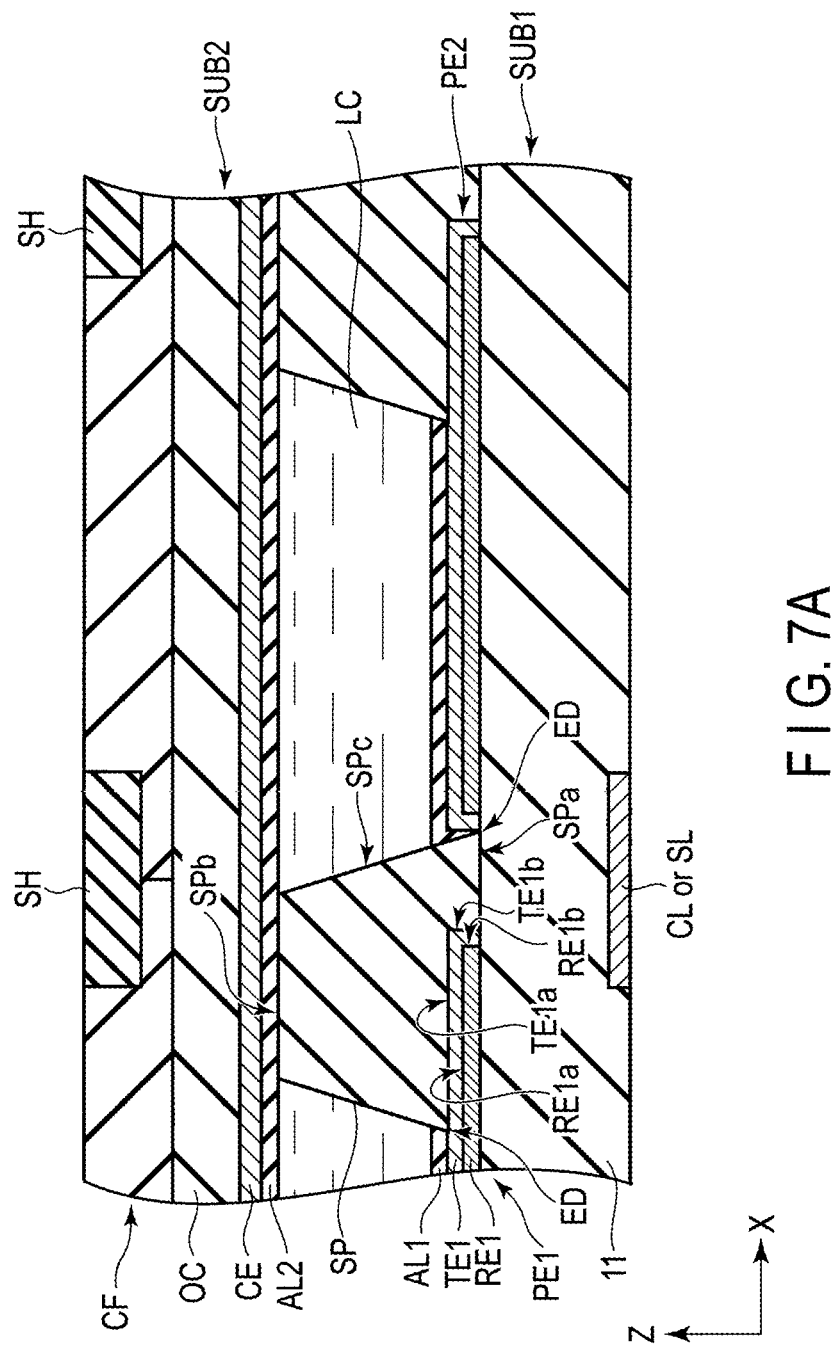
FIG. 7A is an expanded cross section of a display panel of the case where the center of the spacer shifts with respect the center of the crossing region.

FIG. 7A is an enlarged cross section of a display panel when the center of a spacer is displaced from to the center of a crossing region. In the example illustrated, an upper direction is defined as a direction pointed by the arrow of the third direction Z.

The pixel electrode PE1 comprises a reflecting electrode RE1 and a transparent protecting electrode TE1 stacked on the reflecting electrode RE1. The reflecting electrode RE1 is formed of a metal material having high reflectance to visible light, such as aluminum or silver. The protecting electrode TE1 is formed of a transparent conductive material such as ITO or IZO. The reflecting electrode RE1 is disposed on the insulating film 11 and comprises an upper surface RE1a located on a side opposing the second substrate SUB2, and a side surface RE1b located on a side opposing the other reflecting electrode. From a viewpoint of suppressing the corrosion of the reflecting electrode RE1, which may be caused by current flow, the protecting electrode TE1 should desirably cover the upper surface RE1a and the side surface RE1b of the reflecting electrode RE1. The protecting electrode TE1 is covering the reflecting electrode RE1. The protecting electrode TE1 comprises an upper surface TE1a located on a side opposing the second substrate SUB2 and a side surface TE1b located on a side opposing the other protecting electrode.

Spacer SP is disposed on the protecting electrode TE1 and the insulating film 11 so as to be in contact with the upper surface TE1a and the side surface TE1b. The spacer SP comprises a lower surface SPa located in a side opposing the first substrate SUB1, an upper surface SPb located on a side opposing the second substrate SUB2, and side surface SPc which connect the ends of the upper surface SPa and the ends of the lower surface SPb, respectively to each other. In the example illustrated, the side surface SPc is in contact with the ends of the alignment film AL1. For example, in the manufacturing process for the first substrate SUB1, the alignment film AL1 is formed by a coating/drying step after the formation of the spacers SP. Due to such a manufacturing process, it may be considered that the alignment film AL1 is formed to have such a configuration that it is also formed on the upper surface SPb and the side surface SPc. However, since the material of the alignment film AL1 tends to slide down from the upper surface SPb and the side surface SPc of the spacer SP during the period from the coating until the completion of drying, the alignment film AL1 is not substantially formed or extremely thin on the upper surface SPb and the side surface SPc. For this reason, the illustration of the alignment film AL1 on the upper surface SPb and the side surfaces SPc is omitted. The upper surface SPb is in contact with the alignment film AL2 in the example illustrated, but it may be separated from the alignment film AL2. For example, if made to function as a auxiliary spacer which assists to hold the gap G when an external force is added to the display panel PNL, the spacer SP is separated from the alignment film AL2 while no external force is being applied to the display panel PNL.

In the example illustrated, the area of the lower surface SPa is greater than that of the upper surface SPb. When, in a tapered shape, a surface of a smaller area is defined as a top surface and the other surface whose area is greater is defined as a bottom surface, the spacer SP has a regular tapered shape in which the lower surface SPa corresponds to the bottom and the upper surface SPb to the top. Here, the edge ED correspond to the respective end of the lower surface SPa. As will be later described with reference to FIG. 19, if the spacer SP has an inversed tapered shape in which the lower surface SPa corresponds to the top, and the upper surface SPb to the bottom, the edge ED correspond to the end of the upper surface SPb.

In order to improve the adhesion between the spacer SP and its underlayer (the protecting electrode TE1 and the insulating film 11), it is desirable that the area of the adhering surfaces of the spacer SP and the underlayer attaching together be large. In the example illustrated, the adhering surface of the spacer SP side corresponds to the lower surface SPa, whereas the adhering surface of the underlayer side corresponds to the regions of the upper surface TE1a and the side surfaces TE1b of the protecting electrode TE1 and the upper surface of the insulating film 11, which are in contact with the lower surface SPa. Moreover, for example, the spacer SP has better adhesion with respect to an inorganic material than to an organic material. Here, the protecting electrode TE1 is made of an inorganic material and the insulating film 11 is made of an organic material, and therefore, from a viewpoint of improving the adhesion between the spacer SP and the underlayer, it is desirable that the ratio of the upper surface TE1a occupies in the adhesion surface of the underlayer be large.

Figure 7B:
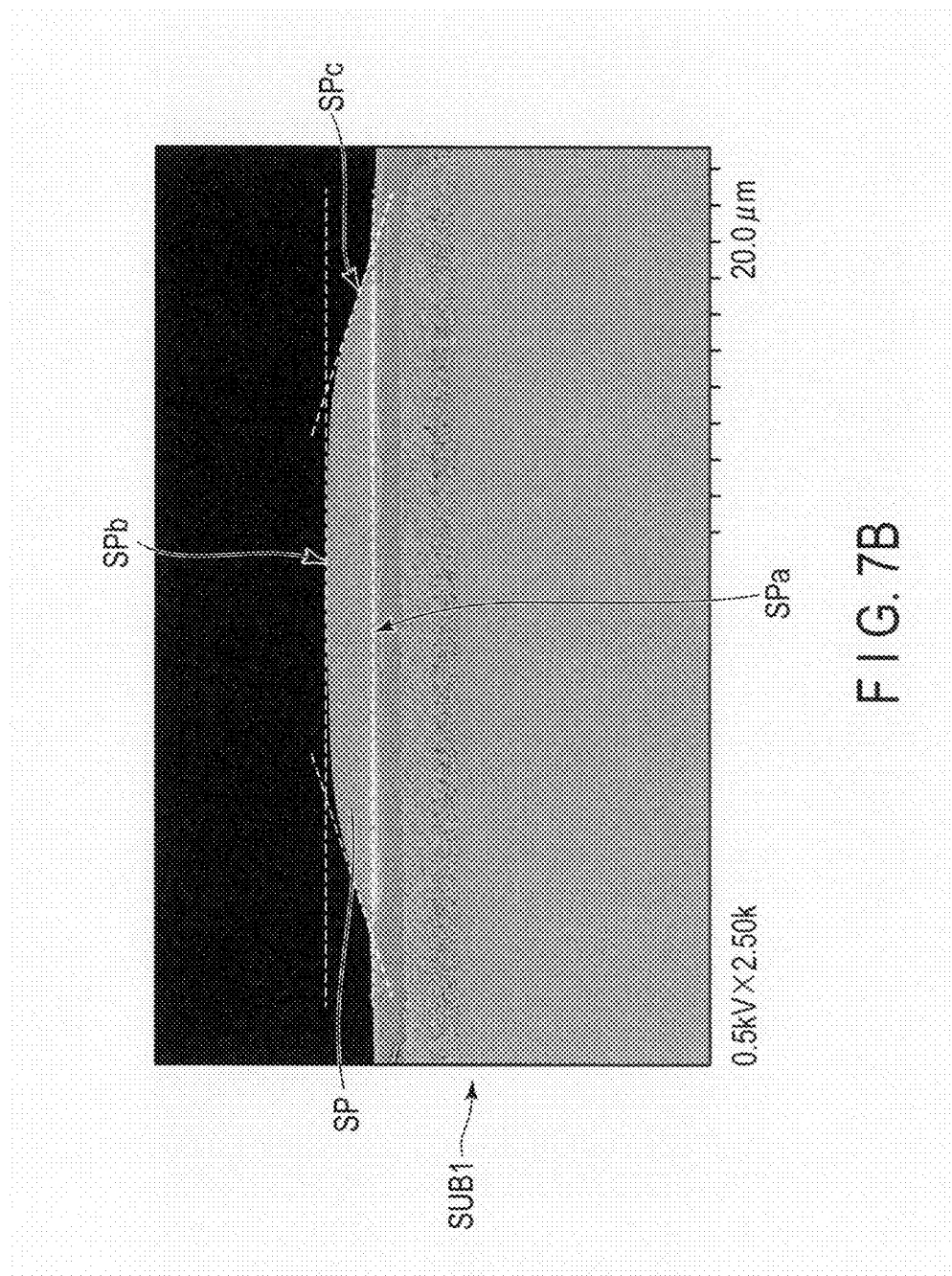
FIG. 7B shows an example of the cross section of the spacer photographed with an electron microscope.

FIG. 7B shows an example of the cross section of a spacer observed under an electron microscope. FIG. 7A is a schematic diagram illustrating a configuration example. Note that an actual spacer SP has a cross section such as shown in FIG. 7A, and may not exhibit such an apparent trapezoidal shape as shown in FIG. 7B.

In this case, an outline formed where the portion of the spacer SP, which is in tight contact with the underlayer as shown in FIG. 7B is assumed as the shape of the lower surface SPa. Here, in the portion most distant along the third direction Z from the lower surface Spa, a straight line LN parallel to the upper surface of the first insulating substrate 10 is drawn. As to the inclination of the sectional shape of the spacer SP with respect to the straight line LN, the region in which the amount of change in the third direction Z with respect to the change in the first direction X in a minute space is assumed as the upper surface SPb, and the region in which the amount of change is 0 or more but less than 1 is assumed as a side surface SPc.

FIG. 8 is a diagram showing a pixel electrode and a spacer when the display panel shown in FIG. 7A is viewed planarly.

The first substrate SUB1 comprises pixel electrodes PE2 to PE4 in addition to the pixel electrode PE1. In a planer view, the pixel electrode PE1 is adjacent to the pixel electrode PE2 along the first direction X while interposing the light-shield SH2 therebetween and also adjacent to the pixel electrode PE3 along the second direction Y while interposing the light-shield SH1 therebetween. The pixel electrode PE4 is adjacent to the pixel electrode PE3 along the first direction X while interposing the light-shield SH2 therebetween and also adjacent to the pixel electrode PE2 along the second direction Y while interposing the light-shield SH1 therebetween. As in the case of the pixel electrode PE1, the pixel electrodes PE2 to PE4 comprise reflecting electrodes RE2 to RE4 and protecting electrodes TE2 to TE4 stacked on the reflecting electrodes RE2 to RE4, respectively. In the example illustrated, the spacer SP is disposed to deviate from the crossing region CR to a direction opposite to the first direction X while overlapping the pixel electrode PE1 and PE3, and has exposed regions ER1 and ER3.

The light-shields SH1 and SH2 overlap an end of each of the reflecting electrodes RE1 to RE4, and also an end of each of the protecting electrodes TE1 to TE4. The reflecting electrodes RE1 to RE4 and the protecting electrodes TE1 to TE4 are extended to apertures AP1 to AP4, respectively. Therefore, the reflecting electrodes RE1 and RE3 and the protecting electrode TE1 and TE3 are extended to the regions opposing the exposed regions ER1 and ER2.

The overlapping portions of the spacer SP will now be described while focusing the region corresponding to the pixel electrode PE1 with reference to FIG. 9.

Figure 9:
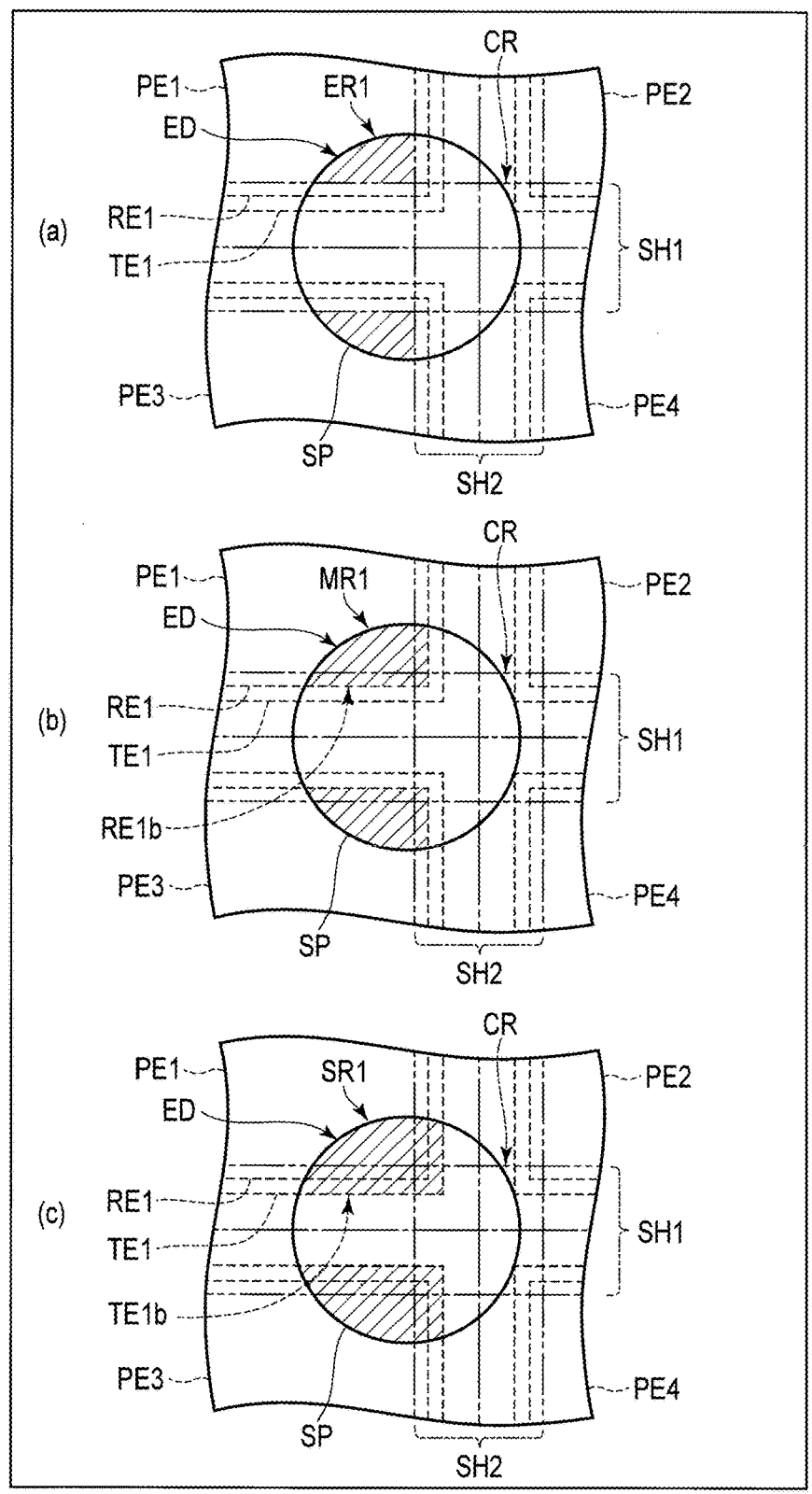
FIG. 9 is a diagram showing an exposed region, a middle region and an overlapping region.

FIG. 9 is a diagram including an exposed region, a middle region and an overlapping region.

The spacer SP illustrated in FIG. 9 is deviated in a similar manner to that of the spacer SP illustrated in FIG. 8. FIG. 9 includes part (a) in which the exposed region ER1 is indicated by diagonally shaded portion, part (b) in which the middle region MR1 is indicated by diagonally shaded portion, and part (c) in which the overlapping region SR1 is indicated by diagonally shaded portion. The middle region MR1 is a region overlapping the reflecting electrode RE1 of the spacer SP in a planer view. The overlapping region SR1 is a region overlapping the pixel electrode PE1 of the spacer SP in a planer view, and it corresponds to the region overlapping the protecting electrode TE1 of the spacer SP.

The exposed region ER1 corresponds to the region defined by the edge ED of the spacer SP and the light-shielding layer SH when the crossing region CR of the light-shielding layer SH is viewed planarly. As described in connection with FIG. 4, the spacer SP should desirably be small from a viewpoint of increasing the ratio of the effective display region to the apertures AP in area. However, if the area of the adhering surface of the spacer SP to its underlayer decreases due to the downsizing of the spacer SP, the adhesion of the spacer SP to the underlayer degrades as described in connection with FIG. 7A. Especially, for example, when the entire spacer SP is overlaid on the light-shielding layer SH in a planer view, the most of the surface of the underlayer is occupied by the surface of the insulating film 11, which is formed of an organic material. As a result, the adhesion of the spacer SP to the underlayer further degrades, and thus the spacer SP may fall off from the substrate. On the other hand, when the spacer SP includes the exposed region ER1, the adhering surface of the underlayer is the protecting electrode TE1, which is formed of an inorganic material. As a result, the adhesion of the spacer SP to the underlayer can be improved. For this reason, it is desirable for the spacer SP to include the exposed region ER1 while reducing the area thereof, from a viewpoint of satisfying both of the expansion the effective display area while improving the aperture ratio and the improvement of the adhesion between the spacer and the substrate. That is, it is desirable for the exposed region ER1 to be defined by the edge ED and the light-shields SH1 and SH2. Note that if the exposed region ER1 is defined by the edge ED and light-shield SH1 without the light-shield SH2, the effective display area is reduced, and therefore the brightness of the apertures AP is lowered, which may cause an adverse effect on the visibility of displayed images.

The middle region MR1 is the region defined by the edge ED and the side surface RE1b in a planer view. The middle region MR1 includes the exposed region ER1.

The overlapping region SR1 is the region defined by the edge ED and the side surface TE1b in a planer view. The overlapping region SR1 includes the middle region MR1. Therefore, the overlapping region SR1 includes the exposed region ER1. In other words, the middle region MR1 is smaller than the overlapping region SR1 in area and greater than the exposed region ER1. From a viewpoint of securing a sufficient adhesion between the spacer and the substrate, the ratio of the total area of the overlapping region occupied in the area of one spacer in a planer view should desirably be 25%.

Note that in this embodiment, the center CSP and the center CCR may overlap in a planer view as described with reference to FIG. 3. Such configuration examples will be described with reference to FIGS. 10 and 11.

FIG. 10 is an enlarged cross section of the display panel when the center of the spacer coincides with the center of the respective crossing region in a planer view.

This configuration example is different from that illustrated in FIG. 7 in that the spacer SP overlaps the pixel electrode PE2. The protecting electrode TE2 includes an upper surface TE2a and a side surface TE2b as in the case of the pixel electrode PE1. The spacer SP overlaps the reflecting electrode RE2 and the protecting electrode TE2, and is in contact with the upper surface TE2a and the side surface TE2b.

FIG. 11 is a diagram showing the pixel electrode and the spacer when the display panel shown in FIG. 10 is viewed planarly.

The spacer SP includes overlapping regions SR1 to SR4. The overlapping regions SR2 to SR4 are regions which overlap the pixel electrodes PE2 to PE4 of the spacer SP and include the exposed regions ER2 to E4, respectively, and correspond to the regions of the spacer SP, which overlap the protecting electrodes TE2 to TE4, respectively. For example, the overlapping regions SR1 to SR4 each have a shape point-symmetrical with respect to the center CSP and the overlapping regions SR1 to SR4 are equal to each other in area.

FIG. 12 shows a graph showing the relationship between the spacer density and the spacer exposure density. FIG. 12 illustrates the relationship of the spacer exposure density to the spacer density based on a displacement DP of the spacer SP described with reference to FIG. 5. The horizontal axis of the figure indicates the spacer density, which is the ratio of the total area of all the spacers SP occupied in the display area DA in a planer view. The vertical axis indicates the spacer exposure density, which is the ratio of the total area of all the exposed regions occupied in the display area DA in a planer view. As the spacer exposure density is higher, the area of the region which contributes to display decreases, and therefore the spacer exposure density should desirably be low.

The dotted line in the graph indicates the change in the spacer exposure density with respect to the spacer density when the displacement DP is constant in the state of: DP>(W11+W12)/2, that is, while the spacer SP is apart from the crossing region CR in a planer view. The solid line indicates the change in the spacer exposure density with respect to the spacer density when the displacement DP is constant in the state of: DP<(W12)/2, that is, the spacer SP opposes the centers CCR. An exposure density difference DD represents the difference in the spacer exposure density for the same spacer density. As the exposure density difference DD is larger, the spacer density becomes larger.

From the graph, it can be understood that in the case where the spacer SP is disposed so as to be partially exposed from the light-shielding layer SH, the crossing regions CR and the spacer SP has the following relationship in position. That is, when the spacer is disposed to be deviated slightly from the respective crossing regions CR, the spacer exposure density to the spacer density is decreased as the entire display panel PNL, which, as a result, contributes to improvement in the aperture ratio, as compared to the case where the spacer SP is deviated greatly from the crossing region CR so as to be substantially disposed at positions irrelevant to the crossing region CR.

According to this embodiment, the display device DSP comprises the light-shielding layer including the light-shields SH1 and the light-shields SH2, and the spacers SP overlapping the crossing regions CR of the light-shields SH1 and light-shields SH2 and including the exposed regions ER1. With this structure, the total area of the overlapping regions where the spacers overlap the pixel electrodes can be increased, thereby improving the adhesion between the substrate and the spacers, and at the same time, the increase in the total area of the exposed regions can be suppressed, thereby suppressing the reduction of the area which contributes to display. As described in connection with FIG. 12, according to this embodiment, as the spacer density required increases, the spacer exposure density can be reduced more, as compared to the case where the spacers are apart from the crossing regions when by viewed planarly. Therefore, it is possible to provide a liquid crystal display which can suppress the degradation of the display quality.

Here, the widths W11 and W21 of each spacer SP are greater than the width W12 of the light-shield SH2 and the width W22 of light-shield SH1 respectively. With this structure, a sufficient overlapping region area can be reserved in the display device, thereby making it possible to achieve excellent adhesion between the spacers and the substrate.

Especially, in the configuration example in which the spacers SP overlap the centers CCR of the respective crossing regions CR, the exposed regions ER1 can be suppressed, and therefore the total area of the exposed regions in the liquid crystal display can be decreased.

Moreover, in the configuration example in which the exposed regions ER1 are each defined by the edge ED of the respective spacer SP and the light-shields SH1 and SH2, the total area of the exposed regions can be suppressed as compared to the configuration example in which the exposed regions ER1 are each defined only by the edge ED and the light-shield SH1 or the light-shield SH2.

In the configuration example in which the pixel electrodes each comprise the protecting electrode stacked on the reflecting electrode and the protecting electrode covers the upper surface and the side surface of the reflecting electrode, the corrosion of the reflecting electrode can be suppressed.

Since the display device DSP is a liquid crystal display of the normally white mode, the lowering of the contrast, which may result from the disorder of the initial alignment of the liquid crystal composition near the exposed regions can be suppressed more as compared to that of the normally black mode.

Next, a modified configuration example will be described with reference to FIGS. 13 to 19. As shown in FIG. 3 or 5, in the disposition of a spacer SP in a crossing region CR of the light-shielding layer SH, it is desirable to have two or more exposed regions ER each defined by the edge ED of the spacer SP and the light-shields SH1 and SH2, which are separated from each other in the configuration. Such a configuration is more preferable that there should be three or more exposed regions ER so partitioned, or most preferably, four exposed regions ER so partitioned. Moreover, it is desirable that at least two of these exposed regions ER be tightly in contact with the protecting electrode TE. Further, as will be described below, it is preferable that one spacer SP include two or more overlapping regions SR opposing each other along the first direction X or the second direction Y, or more preferably, three or more overlapping regions SR, or still more preferably, four overlapping regions SR. In each overlapping region SR, the spacer SP and the protecting electrode TE, formed from an inorganic material, should desirably be tightly attached to each other. With the structure that a plurality of exposed regions ER (overlapping regions SR) are arranged to be separated from each other, these regions, which have strong adhesion to the spacer SP, can be dispersed along the edge ED.

In such modified examples as described above, advantageous effects similar to those described above can be obtained.

FIG. 13 is a diagram showing overlapping regions when the center of a spacer is separated from the center of a respective crossing region in the first direction.

This modified example is different from the configuration example illustrated in FIG. 8 in that the spacer SP comprises overlapping regions SR2 and SR4.

The direction of the displacement DP is opposite to the first direction X and the overlapping region SR1 is larger than the overlapping region SR2. Here, for example, the overlapping regions SR1 and SR2 are axisymmetrical to the overlapping regions SR3 and SR4, respectively, over the light-shield SH1, and the areas of the overlapping regions SR1 and SR2 are equal to those of the overlapping regions SR3 and SR4, respectively.

FIG. 14 is a diagram showing overlapping regions when the center of a spacer is separated from the center of a crossing region in the first direction further than that shown in FIG. 13.

In this modified example, the direction of the displacement DP is the same as that of FIG. 13, and the dimension of the displacement DP is larger.

The spacer SP includes the overlapping regions SR1 and SR3 and is separated from the pixel electrodes PE2 and PE4 in a planer view. Moreover, the spacer SP overlaps the respective crossing region CR and is separated from the center CCR in a planer view. In such a case, it is desirable that the overlapping region SR1 be defined by the edge ED, a portion extending from the side surface TE1*b* along the first direction X, and another portion extending along the second direction Y, from a viewpoint of balancing between the area of the regions which contribute to display and the adhesion of the spacer, which have a trade-off relationship.

FIG. 15 is a diagram showing overlapping regions when the center of a spacer is separated from the center of a crossing region in the second direction further than that of FIG. 13. This modified example is different from that shown in FIG. 13 in that the direction of the displacement DP is opposite to the first direction X and also opposite to the second direction Y.

Each spacer SP includes overlapping regions SR1 to SR4. The overlapping region SR1 is larger than the overlapping region SR2 or SR3 in area. The overlapping region SR4 is smaller than the overlapping region SR2 or SR3 in area. In the example illustrated, the overlapping region SR2 is smaller than the overlapping region SR3 in area. The overlapping regions SR2 to SR4 need not each include an exposed region and in the example illustrated, the overlapping regions SR2 and SR4 are entirely overlaid on the light-shielding layer SH.

FIG. 16 is a diagram showing overlapping regions when the center of a spacer is separated from the center of a respective crossing region in the second direction further than that of FIG. 15.

In this modified example, the dimension of the displacement DP along the second direction Y is greater than that of the modified example illustrated in FIG. 15.

Each spacer SP includes overlapping regions SR1 to SR3 and is separated from a pixel electrode PE4 in a planer view. The overlapping region SR1 is greater than the overlapping region SR2 or SR3 in area. In the example illustrated, the area of the overlapping region CR2 is equal to that of the overlapping region SR3. The overlapping regions SR2 and SR3 may not each include an exposed region and in the example illustrated, the overlapping regions SR2 and SR3 are entirely overlaid on the light-shielding layer SH.

FIG. 17 is a diagram showing overlapping regions when the center of a spacer is separated from the center of a respective crossing region in the first direction further than that shown in FIG. 15.

In this modified example, the dimension of the displacement DP along the first direction X is greater than that of the modified example illustrated in FIG. 15.

Each spacer SP includes overlapping regions SR1 and SR3 and is separated from pixel electrodes PE2 and PE4 in a planer view. The overlapping region SR1 is greater than the overlapping region SR3 in area. In the example illustrated, the overlapping region SR3 includes an exposed region, but it may be entirely overlaid on the light-shielding layer SH.

FIG. 18 is a diagram showing an overlapping region when the center of a spacer is separated from the center of a respective crossing region in the second direction further than that shown in FIG. 17.

In this modified example, the dimension of the displacement DP along the second direction Y is greater than that of the modified example illustrated in FIG. 17.

Each spacer SP includes an overlapping region SR1 and is separated from pixel electrodes PE2 to PE4 in a planer view. From a viewpoint of balance between the area of the regions which contribute to display and the adhesion of the spacer, it is desirable that each spacer SP overlap a corner TE1c formed by the portion of the side surface TE1b, extending in the first direction X and the portion extending in the second direction Y in a planer view.

Figure 19:
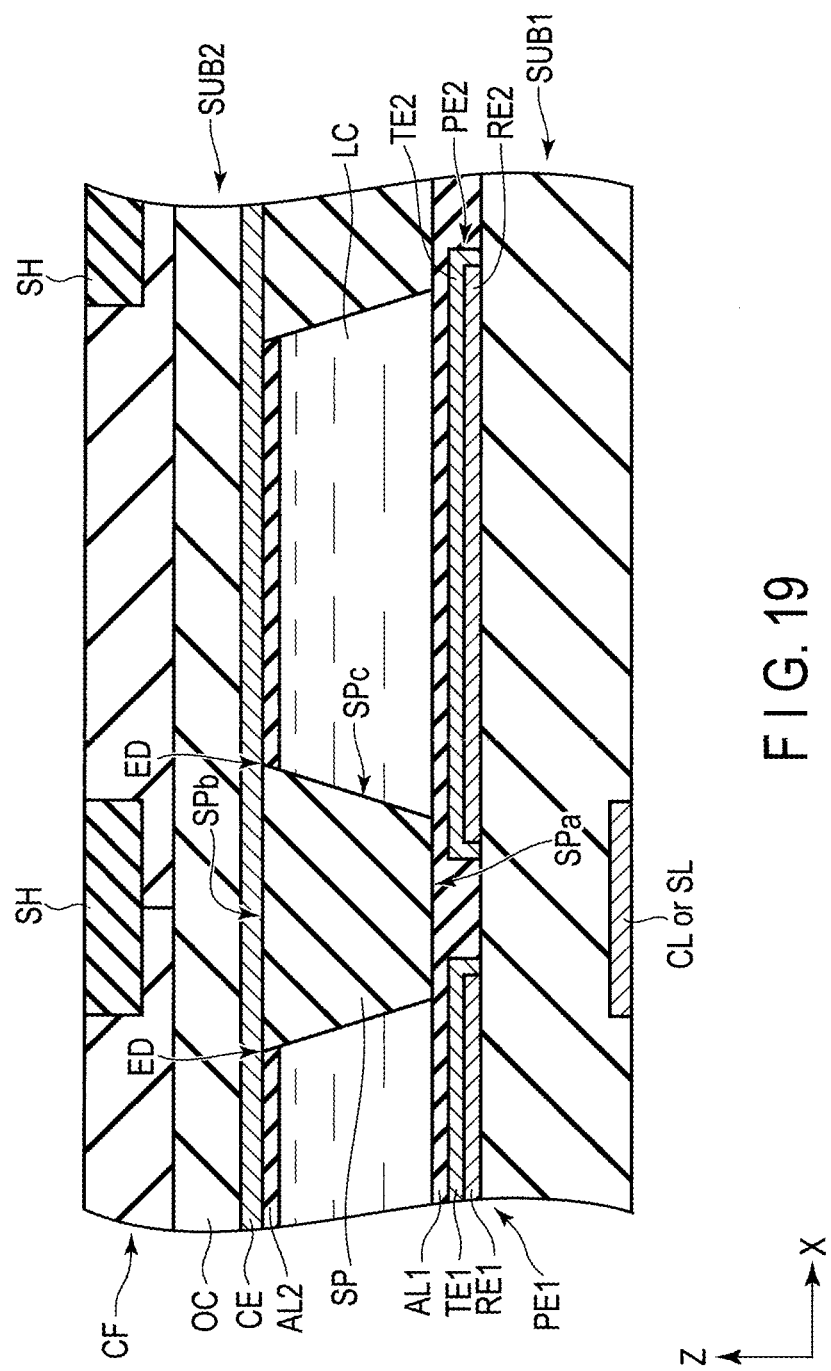
FIG. 19 is a cross section of a display panel when the spacer projects from the second substrate side.

FIG. 19 shows a cross section of a display panel when a spacer projects out from the second substrate side.

This modified example is different from that illustrated in FIG. 10 in that a spacer SP projects from a second substrate SUB2 to a first substrate SUB1.

The spacer SP has the so-called inverse tapered shape with an upper surface SPb being greater in area than a lower surface SPa. The upper surface SPb is in contact with a common electrode CE. Here, the edge ED is equivalent to an end of the upper surface SPb. The lower surface SPa opposes an alignment film AL1 and is in contact therewith in the example illustrated.

Next, the configuration of a reflective display panel PNL of an area gradation mode will be described. For example, such a display panel PNL is a reflective type with the reflective display function which displays images by selectively reflecting light entering from the display surface side, such as outdoor daylight and auxiliary light, by each segment SG. In such a configuration example as well, an advantageous effect similar to that described above can be obtained.

FIG. 20 is a diagram showing the configuration of a display panel. In the example illustrated, a display device DSP comprises a driving module DR, etc. in a display panel PNL.

The display panel PNL comprises, in a display area DA, signal lines SL, control lines CL, unit pixels PX, wiring lines and source lines (not shown) which transmit various types of voltages, etc. The signal lines SL are arranged along in the first direction X. The control lines CL are arranged along the second direction Y crossing the first direction X. The unit pixels PX are arranged in a matrix in the X-Y plane defined by the first direction X and the second direction Y.

Each unit pixel PX is a minimum unit which constitutes a color image. Such a unit pixel PX comprises a plurality of segments, (which may be simply called pixels hereinafter) SG. One unit pixel PX comprises a plurality of sub-pixels, which will be described later. For example, one unit pixel PX comprises a sub-pixel displaying red, a sub-pixel displaying green and a sub-pixel displaying blue. The unit pixel PX may comprise, in addition to the sub-pixels of three colors described above, a sub-pixel displaying a color other than those, such as white. Each sub-pixel comprises a plurality of segments SG.

The driving module DR comprises a signal line driving module D1 and a control line driving module D2. The driving module DR may be formed in a non-display area NDA of the display panel PNL, built in an IC chip mounted in the display panel PNL, or formed in a flexible printed circuit board connected to the display panel PNL.

The signal lines SL are each connected to the signal line driving module D1. The signal line driving module D1 outputs, for example, a signal potential corresponding to a predetermined gradation to the corresponding signal line SL. The control lines CL are each connected to the control line driving module D2. The control line driving module D2 outputs a control signal for controlling the write operation of the signal potential to a segment SG to the corresponding control line CL. In addition, the driving module DR may further comprise a driving timing generation circuit, a power supply circuit, etc.

FIG. 21 is a diagram showing a configuration of the unit pixel.

The unit pixel PX includes four sub-pixels P1 to P4. The sub-pixels P1 and P2 are arranged to be adjacent to each other along the first direction X. The sub-pixels P3 and P4 are arranged to be adjacent to each other along the first direction X. The sub-pixels P1 and P3 are arranged to be adjacent to each other along the second direction Y. The sub-pixels P2 and P4 are arranged to be adjacent to each other along the second direction Y. Here, in the unit pixel PX, a straight line extending in the first direction X is defined as a boundary line B1 and a straight line extending in the second direction Y as a boundary line B2. The boundary line B1 is equivalent to the central axis of a light-shield SHX2, which will be described later and the boundary line B2 is equivalent to the central axis of the light-shield SHY2, which will be also described later. The sub-pixel P1 is adjacent to the sub-pixel P2 via the light-shield SHY2 interposed therebetween, and adjacent to the sub-pixel P3 via the light-shield SHX2 interposed therebetween. The sub-pixel P4 is adjacent to the sub-pixel P3 via the light-shield SHY2 interposed therebetween, and adjacent to the sub-pixel P2 via the light-shield SHX2 interposed therebetween.

The sub-pixels P1 to P4 display different colors, respectively. For example, the sub-pixel P1 displays green (G), the sub-pixel P2 displays red (R), the sub-pixel P3 displays blue (B), and the sub-pixel P4 displays white (W). Such color display is realized by disposing the corresponding color filters to oppose the respective sub-pixels P1 to P4.

The sub-pixels P1 and P2 arranged along the first direction X have the same area. Each of the sub-pixels P1 and P2 is constituted into a quadrangular shape having a length LX/2 along the first direction X and a length LYa in the second direction Y. In the example illustrated, each of the sub-pixels P1 and P2 is constituted into a laterally elongated rectangular shape in which the length LX/2 is greater than the length LYa.

The sub-pixels P3 and P4 arranged along the first direction X have the same area. The area of the sub-pixels P3 and P4 differs from that of the sub-pixels P1 and P2. Each of the sub-pixels P3 and P4 is constituted into a quadrangular shape having a length LX/2 along the first direction X and a length LYb along the second direction Y. The length LYb is greater than the length LYa. In the example illustrated, each of the sub-pixels P3 and P4 is constituted into a longitudinally elongated rectangular shape in which the length LX/2 is less than the length LYa.

That is, in this configuration example, the sub-pixel P1 and the sub-pixel P3 are arranged along the second direction Y, and the sub-pixel P1 exhibits a laterally elongated rectangular shape, whereas the sub-pixel P3 exhibits a longitudinally elongated rectangular shape while sharing the length along the first direction X. Here, if an aspect ratio A of each sub-pixel is defined by the length along the second direction Y/the length along the first direction X, the aspect ratio A1 of the sub-pixel P1 can be expressed as 0<A1<1, and the aspect ratio A3 of the sub-pixel P3 as 1<A3. The relationship between the sub-pixel P2 and the sub-pixel P4 is likewise.

Moreover, the sub-pixel P1 and the sub-pixel P3 have the same length LX/2 along the first direction X. The length LYa of the sub-pixel P1 along the second direction Y is less than the length LYb of the sub-pixel P3 along the second direction Y. Therefore, the area of the sub-pixel P3 is greater than that of the sub-pixel P1. Similarly, the area of the sub-pixel P4 is greater than that of the sub-pixel P2.

In each unit pixel PX, the sub-pixel P1 and the sub-pixel P2 are axisymmetrical to each other with respect to the boundary line B2. Similarly, the sub-pixel P3 and the sub-pixel P4 are axisymmetrical to each other with respect to the boundary line B2. The segments SG11 to SG13 which constitute the sub-pixel P1 are smaller in area than the segments SG31 to SG33 which constitute the sub-pixel P3, respectively. Thus, the configuration of the sub-pixel P3 and that of the sub-pixel P1 are asymmetrical to each other with respect to the boundary line B1. Similarly, the segments SG21 to SG23 which constitute the sub-pixel P2 are smaller in area than the segments SG41 to SG43 which constitute the sub-pixel P4, respectively. Thus, the configuration of the sub-pixel P4 and that of the sub-pixel P2 are asymmetrical to each other with respect to the boundary line B1.

The geometrical center PXC of each unit pixel PX is defined as an intersection of two diagonal lines (dotted line in the figure) of the quadrangle (square in the example illustrated) defined by the outer circumference of the unit pixel PX. Each unit pixel PX has an axisymmetrical configuration with respect to the boundary line B2, the geometrical center PXC is located on the boundary line B2. Further, each unit pixel PX has an asymmetrical configuration with respect to the boundary line B1, the geometrical center PXC is separated from the boundary line B1. That is, the location of the geometrical center PXC differs from that of the intersection PXN between the boundary lines B1 and B2.

The configuration of each sub-pixel will be described in detail. In the following description, the sub-pixel P1 will be described as an example and the detailed description of the other sub-pixels will be omitted.

The sub-pixel P1 comprises three segments SG11 to SG13 for displaying 3-bit gradation.

The segment SG11 is equivalent to the region of the quadrangle located in a central portion in the sub-pixel P1 (that is, a middle point in the length LYa/2 of the sub-pixel P1 along the second direction Y or a region including the location where the distance from the boundary line B1 along the second direction Y is LYa/2). The segment SG11 includes a pair of sides 11A and 11B along the first direction X and a pair of sides 11C and 11D along the second direction Y.

The segment SG12 is located on a side closer to the geometrical center PXC as compared to the segment SG11. The segment SG12 is equivalent to an L-shaped region formed along the sides 11A and 11C. The segment SG12 is adjacent to the sub-pixel P3 via the boundary line B1 interposed therebetween and also adjacent to the sub-pixel P2 via the boundary line B2 interposed therebetween.

The quadrangle region constituted by the segments SG11 and SG12 is similar to the quadrangle region of the segment SG11.

The segment SG13 is located on a side further from the geometrical center PXC as compared to the segment SG11. The segment SG13 is equivalent to an L-shaped region formed along the sides 11B and 11D. Further, the segment SG13 extends in the first direction X over the side 11B and is adjacent to a portion of the segment SG12. Furthermore, the segment SG13 extends in the second direction Y over the side 11D and is adjacent to a portion of the segment SG12. The segment SG13 is greater in area than the segment SG12. The segment SG13 surrounds the segment SG11 together with the segment SG12.

The quadrangle region constituted by the segments SG11, SG12 and SG13 is similar to the quadrangle region of the segment SG11.

In a central part of the sub-pixel P1, the three segments SG11 to SG13 are arranged along the first direction X while the segment SG11 being at the center. In the example illustrated, the segment SG13, the segment SG11 and the segment SG12 are arranged in this order along the first direction X at positions where the distance from the boundary line B1 along the second direction Y is LYa/2.

The area ratio between the segment SG11, the segment SG12 and the segment SG13 is, for example, 1:2:4 ($=2^0:2^1:$ $2^2$). The area ratio used in this embodiment is based only on the area of the region which substantially contributes to display in each segment, and the area of the region overlapping the spacer SP or the light-shielding layer SH, which does not contribute to display, is not included. But such a structure is also employable that the area ratio between the segments including the spacer SP is set to 1:2:4. Note that the area ratio of the segments SG11 to SG13 is not limited to the above-described example.

The segment SG11 is a display region equivalent to the least significant bit (for example, $2^0$) in a 3-bit area gradation. The segment SG13 is a display region equivalent to the most significant bit (for example, $2^2$) in the 3-bit area gradation. The segment SG12 is a display region equivalent to the middle bit (for example, $2^1$) in the 3-bit area gradation. By combinations of the segments SG11 to SG13, it is possible to achieve the 3-bit area gradation display.

The relationship in position among twelve segments which constitute the unit pixel PX illustrated is as follows. That is, focusing on the sub-pixels P1 and P2 arranged along the first direction X, the three segments SG11 to SG13 of the sub-pixel P1 and the three segments SG21 to SG23 of the sub-pixel P2 are axisymmetrical respectively to each other with respect to the boundary line B2. Further, focusing on the sub-pixels P3 and P4 arranged along the first direction X, the three segments SG31 to SG33 of the sub-pixel P3 and the three segments SG41 to SG43 of the sub-pixel P4 are axisymmetrical respectively to each other with respect to the boundary line B2.

In a central part of the sub-pixel P2, the three segments SG21 to SG23 are arranged along the first direction X. In a central part of the sub-pixel P3, the three segments SG31 to SG33 are arranged along the first direction X. In a central part of the sub-pixel P4, the three segments SG41 to SG43 are arranged along the first direction X. Note that in the example illustrated, the segment SG33, the segment SG31, the segment SG32, the segment SG42, the segment SG41 and segment SG43 are arranged in this order along the first direction X at positions where the distance from the boundary line B1 along the second direction Y is LYb/2. Further, the three segments SG11 to SG13 are arranged in the sub-pixel P1 along the first direction X and the three segments SG31 to SG33 arranged in the sub-pixel P3 along the first direction X are located at a pitch along the second direction Y, which is approximately ½ of the length LY of the unit pixel PX along the second direction Y.

The segments SG11 to SG13 each comprise a pixel electrode of a corresponding shape and the pixel electrodes of the segments are separated from each other.

FIG. 22 is a diagram showing the structure of the light-shielding layer corresponding to the unit pixel shown in FIG. 21. In the figure, it is assumed that the light source is located on a negative side along the second direction Y, and the main observation angle orientation is on a positive side along the second direction Y. Here, the main observation angle direction is equivalent to an orientation in which the direction of observation of the reflective display panel PNL shown in FIG. 6 by the user is orthogonally projected on the X-Y plane. The main observation angle orientation is set for the maximum brightness (or the highest reflectivity) by reflecting the light entering the display panel PNL from the light source LS and scattering the reflecting light by the scattering layer FS. When the main observation angle orientation is on a right side of the second direction Y, color mixture easily occurs in the sub-pixels arranged along the second direction Y as compared to the sub-pixels arranged along the first direction X. For example, in the sub-pixels P1 and P3, most of the light reflected by the sub-pixel P1 penetrates the green color filter disposed on the sub-pixel P1, but part of the reflection light in the sub-pixel P1 penetrates the blue color filter disposed on the sub-pixel P3, thereby easily causing color mixture.

The light-shielding layer SH comprises light-shields SHX1 to SHX3 extending along the first direction X and light-shields SHY1 to SHY3 extending along the second direction Y, thus partitioning into the sub-pixels P1 to P4. The light-shields SHX1 to SHX3 have the same width W1. The light-shields SHY1 to SHY3 have the same width W2. The width W1 differs from the width W2. For example, the width W1 of the light-shield SHX2 located between the sub-pixels P1 and P2 and the sub-pixels P3 and P4 is greater than the width W2 of the light-shield SHY2 located between the sub-pixels P1 and P3 and the sub-pixels P2 and P4.

As shown in the figure, the light-shielding layer SH is arranged to locate between adjacent segments. For example, the light-shield SHX4 extends along the first direction X and is located between the segments SG11 and SG13, between the segments SG12 and SG13, between the segments SG22 and SG23 and between the segments SG21 and SG23. The light-shield SHX5 extends along the first direction X and is located between the segments SG31 and SG33, between the segments SG32 and SG33, between the segments SG42 and SG43 and between the segments SG41 and SG43. The light-shield SHY4 extends along the second direction Y and is located between the segments SG11 and SG13, between the segments SG12 and SG13, between the segments SG31 and SG33 and between the segments SG32 and SG33. The light-shield SHY5 extends in the second direction Y and is located between the segments SG21 and SG23, between the segments SG22 and SG23, between the segments SG41 and SG43 and between the segments SG42 and SG43. The light-shields located between respective segments have substantially the same width, for example, has the width W2 same as that of the light-shield SHY2.

For example, the light-shielding layer SH includes a crossing region CR1 where the light-shields SHX1 and SHY1 cross each other, a crossing region CR2 where the light-shields SHX1 and SHY2 cross each other, a crossing region CR3 where the light-shields SHX1 and SHY3 cross each other, a crossing region CR4 where the light-shields SHX2 and SHY1 cross each other, a crossing region CR5 where the light-shields SHX2 and SHY4 cross each other, a crossing region CR6 where the light-shields SHX2 and SHY2 cross each other, a crossing region CR7 where the light-shields SHX2 and SHY5 cross each other, a crossing region CR8 where the light-shields SHX2 and SHY3 cross each other, a crossing region CR9 where the light-shields SHX5 and SHY2 cross each other, a crossing region CR10 where the light-shields SHX3 and SHY1 cross each other, a crossing region CR11 where the light-shields SHX3 and SHY2 cross each other and a crossing region CR12 where the light-shields SHX3 and SHY3 cross each other.

According to the configuration example as described above, even if part of the reflection light in one sub-pixel is reflected toward another sub-pixel in those arranged along the second direction Y, such partial light is shielded by the light-shield SHX2, thereby making it possible to suppress the color mixture. Thus, degradation in display quality can be suppressed.

Figure 23:
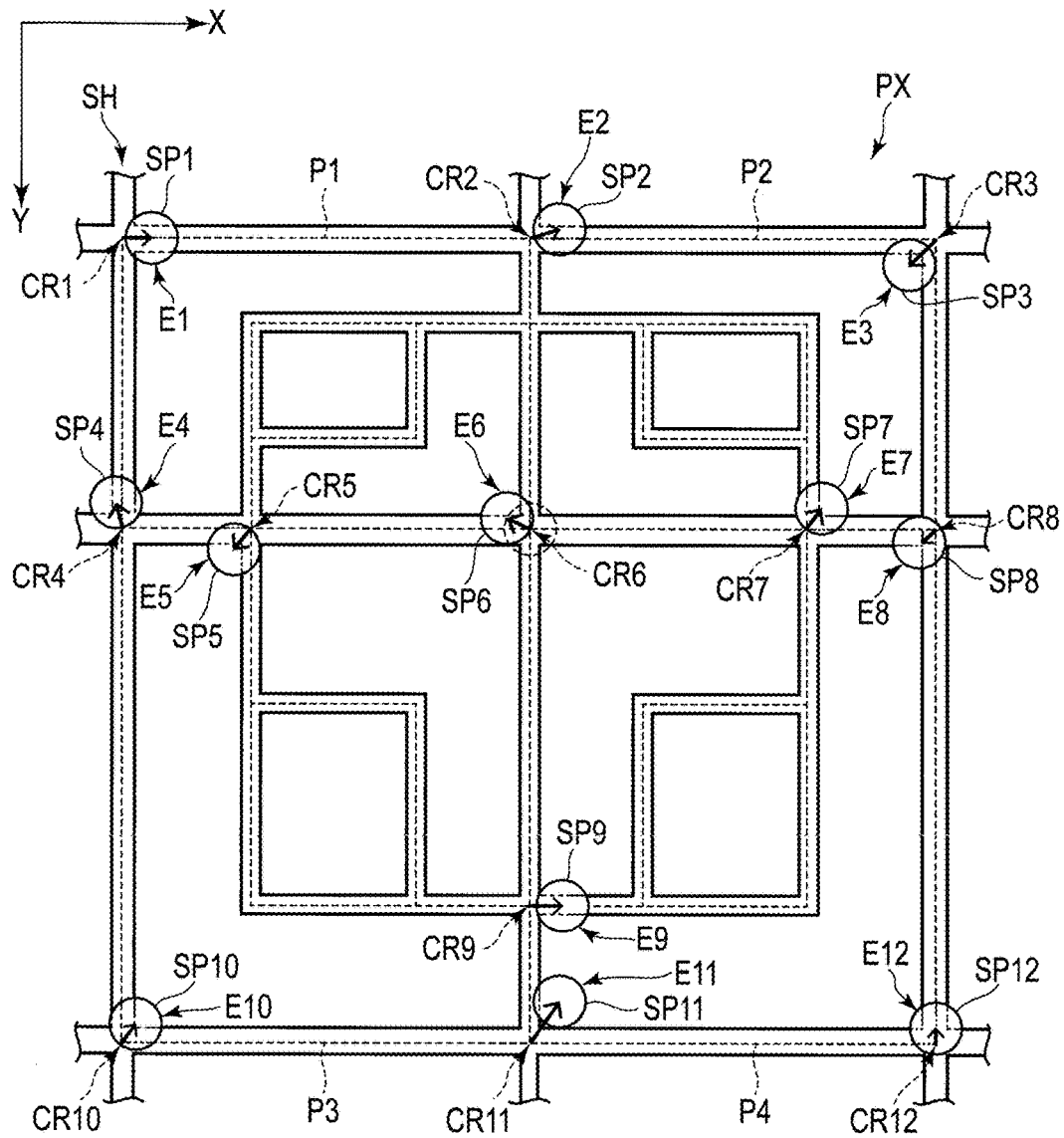
FIG. 23 is a diagram showing an example of arrangement of the spacer corresponding to the unit pixel shown in FIG. 21.

FIG. 23 is a diagram showing an example of arrangement of the spacers corresponding to the unit pixel shown in FIG. 21.

The unit pixel PX includes spacers SP1 to SP12, for example, near the crossing regions CR1 to CR12, respectively. The spacers SP1 to SP12 are overlaid on the light-shielding layer SH, and overlap the crossing regions CR1 to CR12, respectively. The centers of the spacers SP1 to SP12 are separated various directions with respect to the centers of the crossing regions CR1 to CR12, respectively, in a planer view. The arrows of the spacers in FIG. 23 each show the deviating direction of each respective spacer with respect to the center of each respective crossing region. For example, the spacer SP6 overlaps the crossing region CR6 in a planer view and is deviated in the first deviating direction with respect to the center of the crossing region CR6, whereas the spacer SP9 is deviated in the second deviating direction different from the first deviating direction with respect to the center of the crossing region CR9 in a planer view. Among the spacers SP2, SP6, SP9, and SP11 disposed alongside the light-shield SHY2 and arranged along the second direction Y, the deviating directions of the spacers SP2, SP9 and SP11 each have a forward-direction component of the first direction X, whereas the deviating direction of the spacer SP9 has a backward direction component of the first direction X. Among the spacers SP4, SP5, SP6, SP7 and SP8 disposed alongside the light-shield SHX2 and arranged along the first direction X, the deviating directions of the spacers SP5 and SP8 each have a forward direction component of the second direction Y, whereas the deviating directions of the spacer SP4, SP6, and SP7 each have a backward direction component of the second direction Y.

The spacers SP1 to SP12 include the exposed regions E1 to E12, respectively, exposed to the outside of the light-shielding layer SH in a planer view. The exposed regions E1 to E12 are exposed in various directions with respect to the crossing regions CR1 to CR12, respectively, in a planer view. Focusing on, for example, the spacers SP2, SP6, SP9, and SP11 disposed alongside the light-shield SHY2 and arranged along the second direction Y, the exposed regions E2, E9 and E11 included in the spacer SP2, SP9, and SP11 are located adjacent to the light-shield SHY2 in the forward direction of the first direction X, whereas the exposed region E6 of the spacer SP6 is located adjacent to the light-shield SHY2 in the backward direction of the first direction X. That is, the exposed region E6 is located on opposite side to the exposed regions E2, E9 and E11 while interposing the light-shield SHY2 therebetween. Further, focusing on, for example, the spacers SP4, SP5, SP6, SP7 and SP8 disposed alongside the light-shield SHX2 and arranged along the first direction X, the exposed regions E5 and E8 included in the spacer SP5 and SP8 are located adjacent to the light-shield SHX2 in the forward direction of the second direction Y, whereas the exposed regions E4, E6 and E7 of the spacers SP4, SP6, and SP7 are located adjacent to the light-shield SHX2 in the backward direction of the second direction Y. That is, the exposed region E5 and E8 are located on opposite side to the exposed regions E4, E6 and E7 while interposing the light-shield SHX2 therebetween.

According to the configuration example described above, the spacers SP1 to SP12 include the exposed regions E1 to E12, respectively. A plurality of spacers disposed alongside the light-shield extending along the second direction Y, the exposed region of at least one spacer is located adjacent to a light-shield in the forward direction of the first direction X and the exposed region of at least one spacer is located adjacent to a light-shield in the backward direction of the first direction X. With this stricture, even if the first substrate SUB1 deviates to the forward direction or backward direction of the first direction X with respect to the second substrate SUB2, it is possible to suppress the increase in area of the exposed regions and therefore to suppress deterioration of display quality.

Moreover, a plurality of the spacers disposed alongside the light-shield extending in the first direction X, the exposed region of at least one spacer is located adjacent to a light-shield in the forward direction of the second direction Y and the exposed region of at least one spacer is located adjacent to a light-shield in the backward direction of the second direction Y. With this structure, even if the first substrate SUB1 deviates to the forward direction or backward direction of the second direction Y with respect to the second substrate SUB2, it is possible to suppress the increase in area of the exposed regions and therefore suppress deterioration of display quality. Thus, even if the first substrate SUB1 and the second substrate SUB2 deviate with respect to each other in any direction on the X-Y plane defined by the first direction X and the second direction Y, it is possible to suppress the area of the exposed regions of the spacers and suppress deterioration of display quality.

As described above, according to this embodiment, the display device which can suppress deterioration of display quality can be provided.

While certain embodiments have been described, these embodiments have been presented by way of example only, and are not intended to limit the scope of the inventions. For example, the embodiments employ the structure in which with the widths of the light-shield SH1 and SH2 are greater than the interval between of an adjacent pair of reflecting electrodes RE or that of protecting electrodes TE; however it is also possible to employ such a structure that either one or both of the widths of the light-shield SH1 and SH2 are less than the interval between these reflecting electrodes RE or that of the protecting electrode TE.

Indeed, the novel embodiments described herein may be embodied in a variety of other forms; furthermore, various omissions, substitutions and changes in the form of the embodiment described herein may be made without departing from the spirit of the invention. The accompanying claims and their equivalents are intended to cover such forms or modifications as would fall within the scope and spirit of the inventions.

What is claimed is:
1. A liquid crystal display comprising:
a first substrate;
a second substrate opposed to the first substrate;
a liquid crystal layer between the first substrate and the second substrate;
a light-shielding layer including a first light-shield formed along a first direction and a second light-shield formed along a second direction and crossing the first light-shield; and
a spacer which maintains a gap between the first substrate and the second substrate,
wherein
the spacer overlaps a crossing region where the first light-shield and the second light-shield cross each other and includes an exposed region outside the light-shielding layer in a planar view,
the first substrate comprises a first pixel electrode,
the spacer includes a first overlapping region overlapping the first pixel electrode,
the first overlapping region includes the exposed region,
the first pixel electrode comprises a reflecting electrode and a transparent protecting electrode stacked on the reflecting electrode, the protecting electrode covers an upper surface and a side surface of the reflecting electrode, and an area of a region where the spacer and the reflecting electrode overlap each other is less than that of a region where the spacer and the protecting electrode overlap each other, and is greater than that of the exposed region.

2. The liquid crystal display of claim 1, wherein
a width of the spacer along the first direction is greater than that of the second light-shield along the first direction, and
a width of the spacer along the second direction is greater than that of the first light-shield along the second direction.

3. The liquid crystal display of claim 1, wherein the spacer is overlaid on a center of the crossing region.

4. The liquid crystal display of claim 1, wherein
the exposed region is partitioned by an edge of the spacer and the first and second light-shields.

5. The liquid crystal display of claim 1, wherein
the first substrate further comprises a second pixel electrode adjacent to the first pixel electrode along the first direction with the second light-shield therebetween in the planar view, and
the spacer includes a second overlapping region overlapping the second pixel electrode, and
an area of the first overlapping region is the same as that of the second overlapping region.

6. The liquid crystal display of claim 1, wherein
the first substrate further comprises a second pixel electrode adjacent to the first pixel electrode along the first direction with the second light-shield therebetween in the planar view,
the spacer includes a second overlapping region overlapping the second pixel electrode, and
an area of the first overlapping region is greater than that of the second overlapping region.

7. The liquid crystal display of claim 1, wherein
the spacer is in contact with the protecting electrode.

8. The liquid crystal display of claim 1, wherein
the first substrate comprises a plurality of pixel electrodes,
the second substrate comprises a common electrode opposing the plurality of pixel electrodes, and
the spacer is in contact with the common electrode.

9. The liquid crystal display of claim 1, wherein
a width of the first light-shield along the second direction is constant between a position close to the crossing region and a position separated from the crossing region of the first light-shield.

10. The liquid crystal display of claim 1, wherein
the exposed region comprises a first exposed region and a second exposed region, and
the second exposed region opposes the first exposed region through the first or second light-shield.

11. The liquid crystal display of claim 10, wherein
the exposed region further comprises a third exposed region,
the second exposed region opposes the first exposed region through the second light-shield, and
the third exposed region opposes the first exposed region through the first light-shield.

12. The liquid crystal display of claim 11, wherein
the exposed region further comprises a fourth exposed region, and
the fourth exposed region opposes the second exposed region through the first light-shield and opposes the third exposed region through the second light-shield.

13. A liquid crystal display comprising:
a first substrate;
a second substrate opposed to the first substrate;
a liquid crystal layer between the first substrate and the second substrate;
a light-shielding layer including a first light-shield formed along a first direction, a second light-shield and a third light-shield formed in a second direction, a first crossing region where the first light-shield and the second light-shield cross each other, and a second crossing region where the first light-shield and the third light-shield cross each other, and
a spacer including a first spacer overlapping the first crossing region and a second spacer overlapping the second crossing region and holding a gap between the first substrate and the second substrate,
wherein
the first spacer includes a first exposed region outside the light-shielding layer,
the second spacer includes a second exposed region outside the light-shielding layer,
the first exposed region is located adjacent to the first light-shield in a forward direction of the second direction,
the second exposed region is located adjacent to the first light-shield in a backward direction of the second direction,
the liquid crystal display further comprises a unit pixel provided on the first substrate and including a first sub-pixel, a second sub-pixel located adjacent to the first sub-pixel through the second light-shield, a third sub-pixel located adjacent to the first sub-pixel through the first light-shield, and a fourth sub-pixel located adjacent to the second sub-pixel through the first light-shield,
an area of the first sub-pixel is less than that of the third sub-pixel,
an area of the second sub-pixel is less than that of the fourth sub-pixel,
the third sub-pixel is a blue pixel,
the fourth sub-pixel is a white pixel, and
a width of the first light-shield along the second direction is greater than that of the second light-shield along the first direction.

* * * * *